United States Patent
Navarro et al.

(10) Patent No.: US 12,548,229 B2
(45) Date of Patent: Feb. 10, 2026

(54) ROBUST FACIAL ANIMATION FROM VIDEO AND AUDIO

(71) Applicant: Roblox Corporation, San Mateo, CA (US)

(72) Inventors: Iñaki Navarro, Zurich (CH); Dario Kneubuehler, Zurich (CH); Tijmen Verhulsdonck, Gothenburg (SE); Eloi Du Bois, Austin, TX (US); William Welch, San Francisco, CA (US); Charles Shang, San Mateo, CA (US); Ian Sachs, Corte Madera, CA (US); Kiran Bhat, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 165 days.

(21) Appl. No.: 18/686,587

(22) PCT Filed: Jan. 25, 2024

(86) PCT No.: PCT/US2024/012900
§ 371 (c)(1),
(2) Date: Feb. 26, 2024

(87) PCT Pub. No.: WO2024/158985
PCT Pub. Date: Aug. 2, 2024

(65) Prior Publication Data
US 2024/0428492 A1 Dec. 26, 2024

Related U.S. Application Data

(60) Provisional application No. 63/440,993, filed on Jan. 25, 2023.

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/246* (2017.01); *G06T 7/73* (2017.01); *G06T 13/205* (2013.01);
(Continued)

(58) Field of Classification Search
CPC ....... G06T 13/40; G06T 7/246; G06T 13/205; G06T 2207/20081; G06T 2207/20084;
(Continued)

(56) References Cited

U.S. PATENT DOCUMENTS 9,786,084 B1  10/2017  Bhat et al.
10,062,198 B2  8/2018  Bhat et al.
(Continued)

OTHER PUBLICATIONS

Anonymous, Multimodal input and deep learning for robust real-time facial animation and avatar lip sync, ACM Trans. Graph., vol. 1, No. 1, Jan. 2022, 11 pages.
(Continued)

*Primary Examiner* — Grace Q Li
(74) *Attorney, Agent, or Firm* — IP Spring

(57) ABSTRACT

Implementations described herein relate to methods, systems, and computer-readable media to generate animations for a 3D avatar from input video and audio captured at a client device. A camera may capture video of a face while a trained face detection model and a trained regression model output a set of video FACS weights, head poses, and facial landmarks to be translated into the animations of the 3D avatar. Additionally, a microphone may capture audio uttered by a user while a trained facial movement detection model and a trained regression model output a set of audio FACS weights. Additionally, a blending term is provided for identification of lapses in audio. A modularity mixing component fuses the video FACS weights and the audio FACS weights based on the blending term to create final FACS
(Continued)

weights for animating the user's avatar, a character rig, or another animation-capable construct.

14 Claims, 11 Drawing Sheets

(51) Int. Cl.
| | |
|---|---|
| G06T 7/73 | (2017.01) |
| G06T 13/20 | (2011.01) |
| G06V 10/774 | (2022.01) |
| G06V 10/776 | (2022.01) |
| G06V 10/82 | (2022.01) |
| G06V 40/16 | (2022.01) |

(52) U.S. Cl.
CPC ............ *G06V 10/82* (2022.01); *G06V 40/161* (2022.01); *G06V 40/171* (2022.01); *G06T 2207/20081* (2013.01); *G06T 2207/20084* (2013.01); *G06T 2207/30201* (2013.01); *G06V 10/774* (2022.01); *G06V 10/776* (2022.01)

(58) Field of Classification Search
CPC .......... G06T 2207/30201; G06V 10/82; G06V 40/171; G06V 10/811; G06V 40/176
See application file for complete search history.

(56) References Cited

U.S. PATENT DOCUMENTS

| | | | |
|---|---|---|---|
| 10,169,905 | B2 | 1/2019 | Bhat et al. |
| 10,198,845 | B1 | 2/2019 | Bhat et al. |
| 10,521,946 | B1 | 12/2019 | Roche et al. |
| 10,559,111 | B2 | 2/2020 | Sachs et al. |
| 2013/0044183 | A1 | 2/2013 | Jeon et al. |
| 2017/0243387 | A1 | 8/2017 | Li et al. |
| 2019/0356894 | A1* | 11/2019 | Oh ................. H04N 21/234345 |
| 2020/0242383 | A1* | 7/2020 | el Kaliouby ........ B60W 60/001 |
| 2021/0004976 | A1 | 1/2021 | Guizilini et al. |
| 2021/0027511 | A1 | 1/2021 | Shang et al. |

OTHER PUBLICATIONS

Anonymous, "Audiovisual inputs for robust, real-time facial animation with lip sync", ACM Trans. Graph., vol. 1, No. 1, Jan. 2023, 13 pages.
"Preliminary Report on Patentability in International Application No. PCT/US2024/012900", Aug. 7, 2025, 9 Pages.
Aaron Van Den Oord, et al., "Wavenet: A generative model for raw audio", 2016. arXiv preprint arXiv:1609.03499 (2016)., Sep. 19, 2016.
Abhinav Kumar, et al., "Luvli face alignment: Estimating landmarks' location, uncertainty, and visibility likelihood", 2020. In Proceedings of the IEEE/CVF Conference on Computer Vision and Pattern Recognition. 18 pages, Apr. 6, 2020.
Adrian Bulat, et al., "How far are we from solving the 2D & 3D Face Alignment problem? (and a dataset of 230,000 3D facial landmarks)", In 2017 IEEE International Conference on Computer Vision (ICCV). IEEE Computer Society, Los Alamitos, CA, USA, 1021-1030. https://doi.org/10.1109/ICCV.2017.116, Sep. 7, 2017.
Adrian Bulat, et al., "Subpixel Heatmap Regression for Facial Landmark Localization", arXiv preprint arXiv:2111.02360 (2021).
Ahmed Hussen Abdelaziz, et al., "Modality Dropout for Improved Performance-driven Talking Faces", In Proceedings of the 2020 International Conference on Multimodal Interaction (Virtual Event, Netherlands) (ICMI '20). Association for Computing Machinery, New York, NY, USA, 378-386. https://doi.org/10.1145/3382507.3418840, May 27, 2020.
Alex Graves, et al., "Connectionist Temporal Classification: Labelling Unsegmented Sequence Data with Recurrent Neural Networks", 2006, In Proceedings of the 23rd international conference on Machine learning. 369-376.
Alexander Richard, et al., "MeshTalk: 3D Face Animation from Speech using Cross-Modality Disentanglement.", 2021. In 2021 IEEE/CVF International Conference on Computer Vision (ICCV). 1153-1162. https://doi.org/10.1109/ICCV48922.2021.00121, May 20, 2022.
Andrew L Maas, et al., "Rectifier nonlinearities improve neural network acoustic models", 2013. In Proc. icml, vol. 30. Atlanta, Georgia, USA, 6 pages.
Awni Hannun, et al., "Deep speech: Scaling up end-to-end speech recognition", arXiv preprint arXiv:1412.5567 (2014)., Dec. 19, 2014.
Daniel Cudeiro, et al., "Capture, Learning, and Synthesis of 3D Speaking Styles", In Proceedings IEEE Conf. on Computer Vision and Pattern Recognition (CVPR). 10101-10111. http://voca.is.tue.mpg.de/, 2019.
David I Perrett, et al., "Symmetry and Human Facial Attractiveness", 1999. Evolution and Human Behavior 20, 5 (1999), 295-307. https://doi.org/10.1016/S1090-5138(99)00014-8.
Erroll Wood, "3D Face Reconstruction with Dense Landmarks", In Computer Vision—ECCV 2022, Shai Avidan, Gabriel Brostow, Moustapha Cissé, Giovanni Maria Farinella, and Tal Hassner (Eds.). Springer Nature Switzerland, Cham.
Ivan Grishchenko, "Attention Mesh: High-fidelity Face Mesh Prediction in Real-time", 2020. Attention Mesh: High-fidelity Face Mesh Prediction in Real-time. arXiv:2006.10962 [cs.CV], Jun. 19, 2020.
Jiyuan Zhang, et al., "High Performance Zero-Memory Overhead Direct Convolutions", CoRR abs/1809.10170 (2018). arXiv:1809.10170 http://arxiv.org/abs/1809.10170, Sep. 20, 2018.
Jort F Gemmeke, et al., "Audio Set: An Ontology and Human-Labeled Dataset for Audio Events", 2017. Audio set: An ontology and human-labeled dataset for audio events. In 2017 IEEE international conference on acoustics, speech and signal processing (ICASSP). IEEE, 776-780.
Joseph Roth, et al., "Ava active speaker: An audio-visual dataset for active speaker detection", 2020. In ICASSP 2020-2020 IEEE International Conference on Acoustics, Speech and Signal Processing (ICASSP). IEEE, May 25, 2019, 15 pages.
Kaipeng Zhang, et al., "Joint Face Detection and Alignment using Multi-task Cascaded Convolutional Networks", CoRR abs/1604.02878 (2016). arXiv:1604.02878 http://arxiv.org/abs/1604.02878.
Lisha Chen, et al., "Face Alignment with Kernel Density Deep Neural Network", In 2019 IEEE/CVF International Conference on Computer Vision (ICCV). 6991-7001. https://doi.org/10.1109/ICCV.2019.00709.
Mark Sandler, et al., "Inverted Residuals and Linear Bottlenecks:", Mobile Networks for Classification, Detection and Segmentation, CoRR abs/1801.04381 (2018). arXiv:1801.04381 http://arxiv.org/abs/1801.04381, Mar. 21, 2019.
Michael Mcauliffe, et al., "Montreal Forced Aligner: trainable text-speech alignment using Kaldi", 2017. In Interspeech, vol. 2017. 498-502.
Ross Girshick, "Fast R-CNN", In Proceedings of the IEEE international conference on computer vision. 1440-1448., Sep. 27, 2015.
Samuli Laine, et al., "Production-Level Facial Performance Capture Using Deep Convolutional Neural Networks", In Proceedings of the ACM SIGGRAPH /Eurographics Symposium on Computer Animation (Los Angeles, California) (SCA '17). Association for Computing Machinery, New York, NY, USA, Article 10, 10 pages. https://doi.org/10.1145/3099564.3099581, Jun. 2, 2017.
Sergey Ioffe, et al., "Batch Normalization: Accelerating Deep Network Training by Reducing Internal Covariate Shift", In International conference on machine learning. PMLR,, Mar. 2, 2015, 11 pages.
Sina Honari, et al., "Improving Landmark Localization with Semi-Supervised Learning", 2018. arXiv:1709.01591 [cs.CV], Oct. 28, 2018.
Supasorn Suwajanakorn, et al., "Synthesizing Obama: Learning Lip Sync from Audio", 2017. ACM Trans. Graph. 36, 4, Article 95 (Jul. 2017), 13 pages. https://doi.org/10.1145/3072959.3073640.

(56) References Cited

OTHER PUBLICATIONS

Tero Karras, et al., "Audio-Driven Facial Animation by Joint End-to-End Learning of Pose and Emotion", ACM Trans. Graph. 36, 4, Article 94 (Jul. 2017), 12 pages. https://doi.org/10.1145/3072959. 3073658.

Tianye Li, et al., "Learning a model of facial shape and expression from 4D scans", ACM Trans. Graph. 36, 6, Article 194 (Nov. 2017), 17 pages. https://doi.org/10.1145/3130800.3130813.

Vassil Panayotov, et al., "Librispeech: An ASR Corpus Based on Public Domain Audio Books", 2015. In 2015 IEEE international conference on acoustics, speech and signal processing (ICASSP). IEEE, 5206-5210.

Xiaojie Guo, et al., "PFLD: A Practical Facial Landmark Detector", CoRR abs/1902.10859 (2019). arXiv:1902.10859 http://arxiv.org/abs/1902.10859, Mar. 3, 2019.

Xin Chen, et al., "Joint Audio-Video Driven Facial Animation", In 2018 IEEE International Conference on Acoustics, Speech and Signal Processing (ICASSP). 3046-3050. https://doi.org/10.1109/ICASSP.2018.8461502.

Yang Zhou, et al., "VisemeNet: Audio-Driven Animator-Centric Speech Animation", ACM Transactions on Graphics (TOG) 37, 4 (2018), 1-10., May 24, 2018.

Yao Feng, et al., "Joint 3D Face Reconstruction and Dense Alignment with Position Map Regression Network", In Proceedings of the European conference on computer vision (ECCV). 534-551. arXiv:1803.07835, Mar. 21, 2018.

Yao Feng, et al., "Learning an Animatable Detailed 3D Face Model From In-The-Wild Images", ACM Trans. Graph. 40, 4, Article 88 (Jul. 2021), 13 pages. https://doi.org/10.1145/3450626.3459936, Jun. 2, 2021.

Yufei Xu, et al., "ViTPose: Simple Vision Transformer Baselines for Human Pose Estimation", In Advances in Neural Information Processing Systems., Oct. 13, 2022.

Richard, "Audio- and Gaze-driven Facial Animation of Codec Avatars", Retrieved from Internet: https://arxiv.org/abs/2008.05023, 2020, 10 pages.

USPTO, International Search Report for International Patent Application No. PCT/US2024/012900, Apr. 25, 2024, 2 pages.

USPTO, Written Opinion for International Patent Application No. PCT/US2024/012900, Apr. 25, 2024, 7 pages.

* cited by examiner

ROBUST FACIAL ANIMATION FROM VIDEO AND AUDIO

This application is the U.S. National Stage filing under 35 U.S.C. § 371 of International Patent Application No. PCT/US2024/012900, filed on Jan. 25, 2024, which claims the benefit of priority to U.S. Provisional Application Ser. No. 63/440,993, filed on Jan. 25, 2023, entitled "ROBUST FACIAL ANIMATION FROM VIDEO USING NEURAL NETWORKS," the entire contents of both of which are hereby incorporated by reference herein.

TECHNICAL FIELD

Embodiments relate generally to computer-based virtual experiences, and more particularly, to methods, systems, and computer readable media for robust facial animation from video in real-time.

BACKGROUND

Some online platforms (e.g., gaming platforms, media exchange platforms, etc.), allow users to connect with each other, interact with each other (e.g., within a game), create games, and share information with each other via the Internet. Users of online platforms may participate in multiplayer gaming environments or virtual environments (e.g., three-dimensional environments), design custom gaming environments, design characters and avatars, decorate avatars, exchange virtual items/objects with other users, communicate with other users using audio or text messaging, and so forth. Environments such as metaverse or multiverse environments can also enable users that participate to share, sell, or trade objects of their creation with other users.

Users interacting with one another may use interactive interfaces that include presentation of a user's avatar. Animating the avatar may conventionally include having a user input requested gestures, movements, and other similar preconfigured animation details, and presenting an animation based on the user's input. Such conventional solutions suffer drawbacks.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatically creating robust facial animation from video and audio in real-time. According to one aspect, a computer-implemented method comprises: receiving input video frames; receiving input audio frames and a blending term, wherein the input audio frames include audio associated with the input video frames; obtaining video facial action coding system (FACS) weights from a first trained machine learning model based on the input video frames; obtaining audio FACS weights from a second trained machine learning model based on the input audio frames; combining the video FACS weights and the audio FACS weights to obtain final FACS weights, wherein the combining is based at least in part on the blending term; and outputting the final FACS weights to drive facial animation of a 3D model.

Various implementations and variations of the computer-implemented method are disclosed.

In some implementations, the first trained machine learning model and the second trained machine learning model are trained in a two-stage semi-supervised training process.

In some implementations, the first trained machine learning model comprises at least one encoder and at least three task-specific decoders.

In some implementations, a first task-specific decoder of the at least three task-specific decoders is configured to output a predicted headpose, a second task-specific decoder of the at least three task-specific decoders is configured to output a probability that a face is visible in an input video frame of the received input video frames, and a third task-specific decoder of the at least three task-specific decoders is configured to output facial landmarks.

In some implementations, at least one of the at least three task-specific decoders comprises causal convolution layers applied over a time dimension.

In some implementations, the second trained machine learning model comprises at least one encoder and at least two task-specific decoders.

In some implementations, a first task-specific decoder of the at least two task-specific decoders is configured to output the audio FACS weights and a second task-specific decoder of the at least two task-specific decoders is configured to output the blending term.

According to another aspect, a system is provided. The system comprising: a memory with instructions stored thereon; and a processing device, coupled to the memory, the processing device configured to access the memory and execute the instructions, wherein the instructions cause the processing device to perform operations comprising: receiving input video frames; receiving input audio frames and a blending term, wherein the input audio frames include audio associated with the input video frames; obtaining video facial action coding system (FACS) weights from a first trained machine learning model based on the input video frames; obtaining audio FACS weights from a second trained machine learning model based on the input audio frames; combining the video FACS weights and the audio FACS weights to obtain final FACS weights, wherein the combining is based at least in part on the blending term; and outputting the final FACS weights to drive facial animation of a 3D model.

Various implementations and variations of the system are disclosed.

In some implementations, the first trained machine learning model and the second trained machine learning model are trained in a two-stage semi-supervised training process.

In some implementations, the first trained machine learning model comprises at least one encoder and at least three task-specific decoders.

In some implementations, a first task-specific decoder of the at least three task-specific decoders is configured to output a predicted headpose, a second task-specific decoder of the at least three task-specific decoders is configured to output a probability that a face is visible in an input video frame of the received input video frames, and a third task-specific decoder of the at least three task-specific decoders is configured to output facial landmarks.

In some implementations, at least one of the at least three task-specific decoders comprises causal convolution layers applied over a time dimension.

In some implementations, the second trained machine learning model comprises at least one encoder and at least two task-specific decoders.

In some implementations, a first task-specific decoder of the at least two task-specific decoders is configured to output the audio FACS weights and a second task-specific decoder of the at least two task-specific decoders is configured to output the blending term.

According to another aspect, a non-transitory computer-readable medium is provided. The non-transitory computer-readable medium with instructions stored thereon that, responsive to execution by a processing device, causes the processing device to perform operations comprising: receiving input video frames; receiving input audio frames and a blending term, wherein the input audio frames include audio associated with the input video frames; obtaining video facial action coding system (FACS) weights from a first trained machine learning model based on the input video frames; obtaining audio FACS weights from a second trained machine learning model based on the input audio frames; combining the video FACS weights and the audio FACS weights to obtain final FACS weights, wherein the combining is based at least in part on the blending term; and outputting the final FACS weights to drive facial animation of a 3D model.

Various implementations and variations of the non-transitory computer-readable medium are disclosed.

In some implementations, the first trained machine learning model and the second trained machine learning model are trained in a two-stage semi-supervised training process.

In some implementations, the first trained machine learning model comprises at least one encoder and at least three task-specific decoders.

In some implementations, a first task-specific decoder of the at least three task-specific decoders is configured to output a predicted headpose, a second task-specific decoder of the at least three task-specific decoders is configured to output a probability that a face is visible in an input video frame of the received input video frames, and a third task-specific decoder of the at least three task-specific decoders is configured to output facial landmarks.

In some implementations, at least one of the at least three task-specific decoders comprises causal convolution layers applied over a time dimension.

In some implementations, the second trained machine learning model comprises at least one encoder and at least two task-specific decoders, and wherein a first task-specific decoder of the at least two task-specific decoders is configured to output the audio FACS weights and a second task-specific decoder of the at least two task-specific decoders is configured to output the blending term.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications; and all such modifications are within the scope of this disclosure.

DETAILED DESCRIPTION

Figure 1:
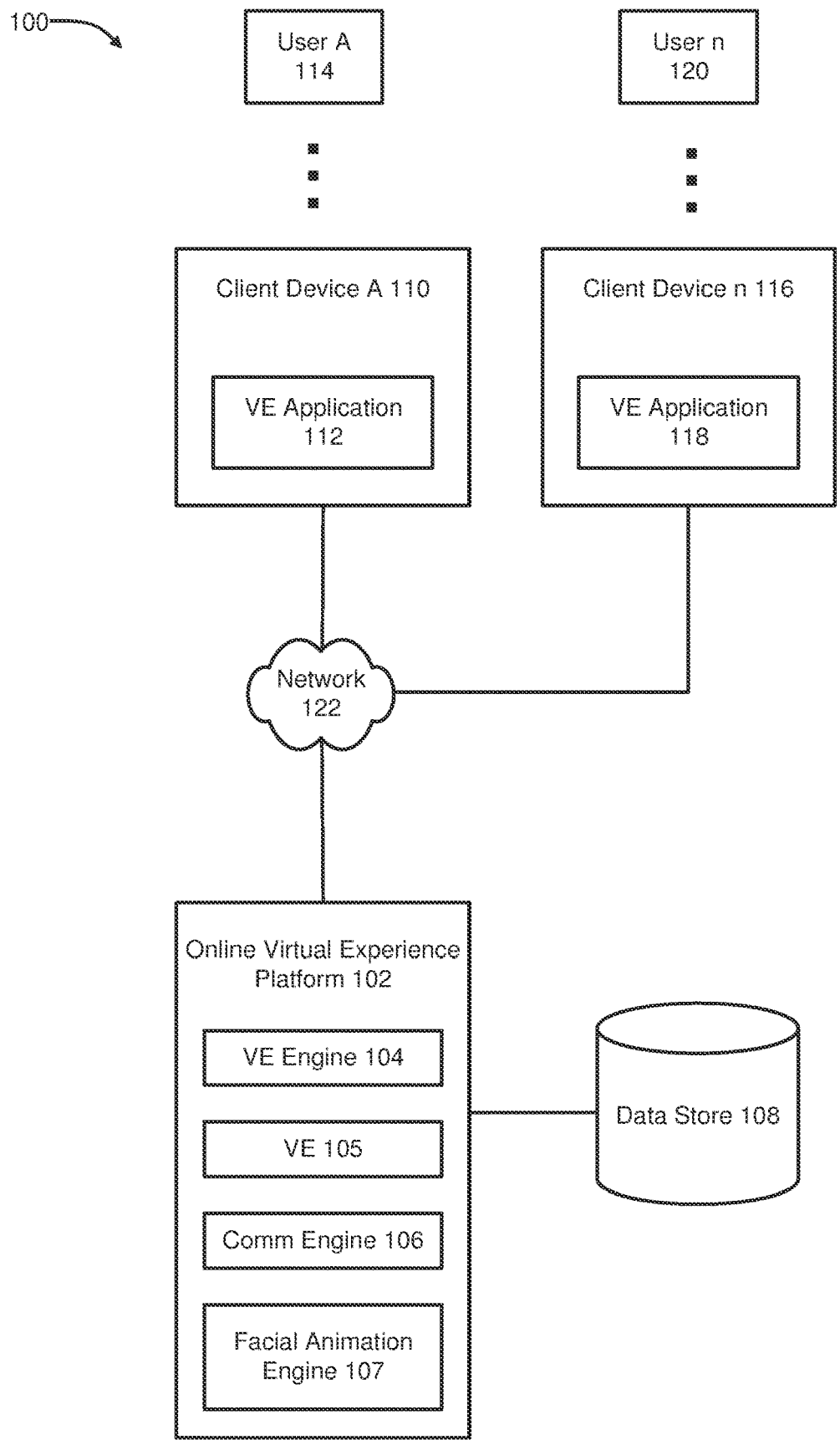
FIG. 1 is a diagram of an example network environment, in accordance with some implementations.

One or more implementations described herein relate to real-time robust animation from video and audio. Features can include automatically creating an animation of a three-dimensional (3D) avatar, based upon input video and input audio received from a client device.

Features described herein provide automatic detection of faces in video, automatic detection/identification of facial movements from phonemes in audio, regression of parameters used to animate a 3D avatar from the detected faces and facial movements, and creation of an animation of the 3D avatar based on the parameters. Trained models receive the audio and the video input, and output audio and video facial action coding system (FACS) weights. A modularity mixing component combines the audio FACS weights and the video FACS weights to obtain final FACS weights for facial animation.

The trained models may be deployed at client devices for use by users desiring to have automatically created animation for their associated avatars. The client devices may further be configured to be in operative communication with online platforms, such as a virtual experience (VE) platform, wherein their associated avatars may be richly animated for presentation in communication interfaces (e.g., video chat), within virtual experiences (e.g., richly animated faces on a representative virtual body), within animated videos transmitted to other users (e.g., by sending recordings of the animated avatars through a chat function or other functionality), and within other portions of the online platforms.

Online virtual experience platforms (also referred to as "user-generated content platforms" or "user-generated content systems") offer a variety of ways for users to interact with one another. For example, users of an online virtual experience platform may create experiences, games, or other content or resources (e.g., characters, graphics, items for game play within a virtual world, etc.) within the platform.

Users of an online virtual experience platform may work together towards a common goal in a game or in game creation, share various virtual items, send electronic messages to one another, and so forth. Users of an online virtual experience platform may interact with an environment, play games, e.g., including characters (avatars) or other game objects and mechanisms. An online virtual experience platform may also allow users of the platform to communicate with each other. For example, users of the online virtual experience platform may communicate with each other using voice messages (e.g., via voice chat), text messaging, video messaging, or a combination of the above. Some online virtual experience platforms can provide a virtual three-dimensional environment in which users can represent themselves using an avatar or virtual representation of themselves.

In order to help enhance the entertainment value of an online virtual experience platform, the platform can provide a facial animation engine to facilitate automatically animating avatars. The facial animation engine may allow users to request or select options for animation, including, for example, animation of a face or body of an avatar based upon a live video-feed and/or live audio transmitted from the client device.

For example, a user can allow camera access and microphone access by an application on the user device associated with the online virtual experience platform. The video created at the camera may be interpreted to extract gestures or other information that facilitates animation of the avatar based upon the extracted gestures. Additionally, audio captured at the microphone may be interpreted to extract facial movements. Users may also augment facial animation through input of directed controls to move other body parts or exaggerate facial gestures.

In situations in which certain implementations discussed herein may obtain or use user data (e.g., images of users, video of users, audio of users, user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

As described herein, automatic detection of faces in video, automatic detection/identification of facial movements from phonemes in audio, regression of parameters used to animate a 3D avatar from the detected faces and facial movements, and creation of an animation of the 3D avatar based on the parameters, may be provided by trained models. Model training may include two of more phases, for example, whereby portions of a model (e.g., an encoder) is trained first and subsequently, another portion of the model (e.g., one or more decoders) are trained using outputs from the trained encoder. Such two-phase training may overcome drawbacks associated with typical automatic animation including jitter, delay, exaggerated movement, minimized movement, unrealistic movement, and others. Technical effects and benefits of the two-phase training may include reduced training cycles which can improve energy consumption (e.g., by reducing training time, energy use of computational resources used for training is decreased), reduce compute cycles (e.g., by reducing training time and total number of compute cycles may be decreased), improve storage requirements (e.g., by using both synthetic and real data, portions of training data may be created during training rather than stored), and others.

As further described herein, the deployed, trained models may operate to provide automatic animation of avatars that is both realistic and stable. For example, realistic animation may refer to animation having movements that appear natural with conformance between facial movement and audio. For example, stable animation may refer to animation with no jarring transitions between consecutive frames of sequences of frames of the animation. The trained models may overcome drawbacks associated with typical automatic animation including jitter, delay, exaggerated movement, minimized movement, unrealistic movement, and others. Technical effects and benefits of the deployed trained models may include improved energy consumption at client devices (e.g., by deploying trained models with adjustable level-of-detail, compute cycles and therefore energy use at client devices may be reduced), improved energy consumption at server devices (e.g., by deploying trained models with improved efficiency of FACS output generation, compute cycles and therefore energy use at server devices may be reduced), and others.

These and other advantages of the present disclosure are apparent from the included description and associated figures. Turning now to FIG. 1, an example system architecture where models may be trained and/or deployed is described in detail.

FIG. 1: Example System Architecture

FIG. 1 illustrates an example network environment 100, in accordance with some implementations of the disclosure. The network environment 100 (also referred to as "system" herein) includes an online virtual experience platform 102, a first client device 110, a second client device 116 (generally referred to as "client devices 110/116" herein), all connected via a network 122. The online virtual experience platform 102 can include, among other things, a virtual experience (VE) engine 104, one or more virtual experiences 105, a communication engine 106, a facial animation engine 107, and a data store 108. The client device 110 can include a virtual experience application 112. The client device 116 can include a virtual experience application 118. Users 114 and 120 can use client devices 110 and 116, respectively, to interact with the online virtual experience platform 102.

Network environment 100 is provided for illustration. In some implementations, the network environment 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online virtual experience platform 102 can include a server having one or more computing devices (e.g., a cloud computing system, a rackmount server, a server computer, cluster of physical servers, virtual server, etc.). In some implementations, a server may be included in the online virtual experience platform 102, be an independent system, or be part of another system or platform.

In some implementations, the online virtual experience platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience platform 102 and to provide a user with access to online virtual experience platform 102. The online virtual experience platform 102 may also include a website (e.g., one or more webpages) or application back-end software that may be used to provide a user with access to content provided by online virtual experience platform 102. For example, users may access online virtual experience platform 102 using the virtual experience application 112/118 on client devices 110/116, respectively.

In some implementations, online virtual experience platform 102 may include a type of social network providing connections between users or a type of user-generated content system that allows users (e.g., end-users or consumers) to communicate with other users via the online virtual experience platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience platform 102 may be a virtual gaming platform. For example, the gaming platform may provide single-player or multi-player games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may search for games and game items, and participate in gameplay with other users in one or more games. In some implementations, a game may be played in real-time with other users of the game.

In some implementations, other collaboration platforms can be used with the robust animation features described herein instead of or in addition to online virtual experience platform 102. For example, a social networking platform, video chat platform, messaging platform, user content creation platform, virtual meeting platform, etc. can be used with the robust animation features described herein to facilitate rapid, robust, and accurate representation of a user's facial movements onto a virtual avatar, based upon input video and/or audio.

In some implementations, "gameplay" may refer to interaction of one or more players using client devices (e.g., 110 and/or 116) within a game or experience (e.g., VE 105) or the presentation of the interaction on a display or other output device of a client device 110 or 116.

One or more virtual experiences 105 are provided by the online virtual experience platform. In some implementations, a virtual experience 105 can include an electronic file that can be executed or loaded using software, firmware or hardware configured to present virtual content (e.g., digital media items) to an entity. In some implementations, a virtual experience application 112/118 may be executed and a virtual experience 105 rendered in connection with a virtual experience engine 104. In some implementations, a virtual experience 105 may have a common set of rules or common goal, and the environments of a virtual experience 105 share the common set of rules or common goal. In some implementations, different virtual experiences may have different rules or goals from one another. Similarly, or alternatively, some virtual experiences may lack goals altogether, with an intent being the interaction between users in any social manner.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 105 may be collectively referred to a "world" or "virtual world" or "virtual universe" or "metaverse" herein. An example of a world may be a 3D world of a virtual experience 105. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual content (or at least present content to appear as 3D content whether or not 3D representation of geometric data is used). 2D environments or 2D worlds use graphics that use two-dimensional representation of geometric data representative of virtual content.

In some implementations, the online virtual experience platform 102 can host one or more virtual experiences 105 and can permit users to interact with the virtual experiences 105 (e.g., search for games, VE-related content, or other content) using a virtual experience application 112/118 of client devices 110/116. Users (e.g., 114 and/or 120) of the online virtual experience platform 102 may play, create, interact with, or build virtual experiences 105, search for virtual experiences 105, communicate with other users, create and build objects (e.g., also referred to as "item(s)" or "game objects" or "virtual game item(s)" herein) of virtual experiences 105, and/or search for objects. For example, in generating user-generated virtual items, users may create characters, decoration for the characters, one or more virtual environments for an interactive experience, or build structures used in a virtual experience 105, among others.

In some implementations, users may buy, sell, or trade virtual objects, such as in-platform currency (e.g., virtual currency), with other users of the online virtual experience platform 102. In some implementations, online virtual experience platform 102 may transmit virtual content to virtual experience applications (e.g., 112, 118). In some implementations, virtual content (also referred to as "content" herein) may refer to any data or software instructions (e.g., virtual objects, experiences, user information, video, images, commands, media item, etc.) associated with online virtual experience platform 102 or virtual experience applications.

In some implementations, virtual objects (e.g., also referred to as "item(s)" or "objects" or "virtual game item(s)" herein) may refer to objects that are used, created, shared or otherwise depicted in virtual experience applications 105 of the online virtual experience platform 102 or virtual experience applications 112 or 118 of the client devices 110/116. For example, virtual objects may include a part, model, character, tools, weapons, clothing, buildings, vehicles, currency, flora, fauna, components of the aforementioned (e.g., windows of a building), and so forth.

It may be noted that the online virtual experience platform 102 hosting virtual experiences 105, is provided for purposes of illustration, rather than limitation. In some implementations, online virtual experience platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 105 may be associated with a particular user or a particular group of users (e.g., a private experience), or made widely available to users of the online virtual experience platform 102 (e.g., a public experience). In some implementations, where online virtual experience platform 102 associates one or more virtual experiences 105 with a specific user or group of users, online virtual experience platform 102 may associated the specific user(s) with a virtual experience 105 using user account information (e.g., a user account identifier such as username and password). Similarly, in some implementations, online virtual experience platform 102 may associate a specific developer or group of developers with a virtual experience 105 using developer account information (e.g., a developer account identifier such as a username and password).

In some implementations, online virtual experience platform 102 or client devices 110/116 may include a virtual experience engine 104 or virtual experience application 112/118. The virtual experience engine 104 can include a virtual experience application similar to virtual experience application 112/118. In some implementations, virtual experience engine 104 may be used for the development or execution of virtual experiences 105. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.). In some implementations, virtual experience applications 112/118 of client devices 110/116, respectively, may work independently, in collaboration with virtual experience engine 104 of online virtual experience platform 102, or a combination of both.

In some implementations, both the online virtual experience platform 102 and client devices 110/116 execute a virtual experience engine (104, 112, and 118, respectively). The online virtual experience platform 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 105 may have a different ratio between the virtual experience engine functions that are performed on the online virtual experience platform 102 and the virtual experience engine functions that are performed on the client devices 110 and 116.

For example, the virtual experience engine 104 of the online virtual experience platform 102 may be used to generate physics commands in cases where there is a collision between at least two game objects, while the additional virtual experience engine functionality (e.g., generate rendering commands) may be offloaded to the client device 110. In some implementations, the ratio of virtual experience engine functions performed on the online virtual experience platform 102 and client device 110 may be changed (e.g., dynamically) based on interactivity conditions. For example, if the number of users participating in a virtual experience 105 exceeds a threshold number, the online virtual experience platform 102 may perform one or more virtual experience engine functions that were previously performed by the client devices 110 or 116.

For example, users may be interacting with a virtual experience 105 on client devices 110 and 116, and may send control instructions (e.g., user inputs, such as right, left, up, down, user election, or character position and velocity information, etc.) to the online virtual experience platform 102. Subsequent to receiving control instructions from the client devices 110 and 116, the online virtual experience platform 102 may send interaction instructions (e.g., position and velocity information of the characters participating in the virtual experience or commands, such as rendering commands, collision commands, etc.) to the client devices 110 and 116 based on control instructions. For instance, the online virtual experience platform 102 may perform one or more logical operations (e.g., using virtual experience engine 104) on the control instructions to generate interaction instruction for the client devices 110 and 116. In other instances, online virtual experience platform 102 may pass one or more or the control instructions from one client device 110 to other client devices (e.g., 116) participating in the virtual experience 105. The client devices 110 and 116 may use the instructions and render the experience for presentation on the displays of client devices 110 and 116.

In some implementations, the control instructions may refer to instructions that are indicative of in-experience actions of a user's character or avatar. For example, control instructions may include user input to control the in-experience action, such as right, left, up, down, user selection, gyroscope position and orientation data, force sensor data, etc. The control instructions may include character position and velocity information. In some implementations, the control instructions are sent directly to the online virtual experience platform 102. In other implementations, the control instructions may be sent from a client device 110 to another client device (e.g., 116), where the other client device generates play instructions using the local virtual experience engine 104. The control instructions may include instructions to play a voice communication message or other sounds from another user on an audio device (e.g., speakers, headphones, etc.), move a character or avatar, and other instructions.

In some implementations, interaction or play instructions may refer to instructions that allow a client device 110 (or 116) to render movement of elements of a virtual experience, such as a multiplayer game. The instructions may include one or more of user input (e.g., control instructions), character position and velocity information, or commands (e.g., physics commands, rendering commands, collision commands, etc.). As described more fully herein, other instructions may include facial animation instructions extracted through analysis of an input video of a user's face, to direct the animation of a representative virtual face of a virtual avatar, in real-time. Accordingly, while interaction instructions may include input by a user to directly control some body motion of a character, interaction instructions may also include gestures extracted from video of a user.

In some implementations, characters (or virtual objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the virtual experience 105. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character object (e.g., body parts, etc.) but the user may control the character (without the character object) to facilitate the user's interaction with a game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience platform 102. In some implementations, creating, modifying, or customizing characters, other virtual objects, virtual experiences 105, or virtual environments may be performed by a user using a user interface (e.g., developer interface) and with or without scripting (or with or without an application programming interface (API)). It may be noted that for purposes of illustration, rather than limitation, characters are described as having a humanoid form. It may further be noted that characters may have any form such as a vehicle, animal, inanimate object, or other creative form.

In some implementations, the online virtual experience platform 102 may store characters created by users in the data store 108. In some implementations, the online virtual experience platform 102 maintains a character catalog and experience catalog that may be presented to users via the virtual experience engine 104, virtual experience 105, and/or client device 110/116. In some implementations, the experience catalog includes images of different experiences stored on the online virtual experience platform 102. In addition, a user may select a character (e.g., a character created by the user or other user) from the character catalog to participate in the chosen experience. The character catalog includes images of characters stored on the online virtual experience platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online virtual experience platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the virtual experience application 112 or 118, respectively. In one implementation, the virtual experience application 112 or 118 may permit users to use and interact with online virtual experience platform 102, such as search for a particular experience or other content, control a virtual character in a virtual game hosted by online virtual experience platform 102, or view or upload content, such as virtual experiences 105, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a program) that is installed and executes local to client device 110 or 116 and allows users to interact with online virtual experience platform 102. The virtual experience application may render, display, or present the content (e.g., a web page, a user interface, a media viewer) to a user. In an implementation, the virtual experience application may also include an embedded media player (e.g., a Flash® player) that is embedded in a web page.

According to aspects of the disclosure, the virtual experience application 112/118 may be an online virtual experience platform application for users to build, create, edit, upload content to the online virtual experience platform 102 as well as interact with online virtual experience platform 102 (e.g., play and interact with virtual experience 105 hosted by online virtual experience platform 102). As such, the virtual experience application 112/118 may be provided to the client device 110 or 116 by the online virtual experience platform 102. In another example, the virtual experience application 112/118 may be an application that is downloaded from a server.

In some implementations, a user may login to online virtual experience platform 102 via the virtual experience application. The user may access a user account by providing user account information (e.g., username and password) where the user account is associated with one or more characters available to participate in one or more virtual experiences 105 of online virtual experience platform 102.

In general, functions described as being performed by the online virtual experience platform 102 can also be performed by the client device(s) 110 or 116, or a server, in other implementations if appropriate. In addition, the functionality attributed to a particular component can be performed by different or multiple components operating together. The online virtual experience platform 102 can also be accessed as a service provided to other systems or devices through appropriate application programming interfaces (APIs), and thus is not limited to use in websites.

In some implementations, online virtual experience platform 102 may include a communication engine 106. In some implementations, the communication engine 106 may be a system, application, or module that permits the online virtual experience platform 102 to provide video communication functionality to users, functionality permits the users to experience a virtual chat or virtual video conference using the online virtual experience platform 102 and associated virtual representations of themselves. For example, a user may design and build a virtual avatar, and use the virtual avatar through the chat functionality provided by the communication engine 106.

In various implementations, the platform 102 may provide chat functionality and/or avatar animation functionality through the communication engine 106 and other components, such as an animation engine or a facial animation engine. In these and other implementations, the communication engine 106 may leverage automatic generation of FACS weights to animate an avatar representative of a user utilizing the chat functionality while being presented as the animated avatar. For example, rather than transmitting video over the network 122, the communication engine 106 may transmit audio data and FACS weights. In response to receipt of the audio data and FACS weights, a receiving VE Application 112 may animate an avatar and present the animated avatar in a graphical user interface (GUI) or another interface. Accordingly, users may "chat through an avatar" rather than be presented on live video.

In some implementations, online virtual experience platform 102 may include a facial animation engine 107. In some implementations, the facial animation engine 107 may be a system, application, or module that implements face detection (e.g., from video analysis), facial movement detection (e.g., from audio analysis), and regression models to create a robust real-time animation of a user's avatar or character face based upon both audio and video signals. The animation may be based upon a user's actual face and uttered speech, and as such, may include smiles, blinks, winks, frowns, head poses, and other gestures extracted from an input video of the user's face as well as audio of the user's mouth uttering phrases. While illustrated as being executed directly on the online virtual experience platform 102, it should be understood that face detection, audio processing, and regression models may be implemented on each client device 110, 116, for example, or on other devices.

The facial animation engine 107, in conjunction with the communication engine 106, may provide some or all of the avatar chat functionality described above. For example, the facial animation engine 107 may receive input video and input audio, and output associated FACS weights to the communication engine 106 (or to the VE Engine 104). The communication engine 106 may subsequently (or at substantially the same time) transmit the FACS weights and user audio data for presentation through a receiving chat interface and associated components.

In some implementations, the facial animation engine 107 may also be used to present realistic avatar animation within a virtual experience 105, within a 3D environment during gameplay or virtual activities, and others. As such, while described in some implementations as being related to chat functions, the features provided by the facial animation engine 107 may also be used to animate avatars: within a game, within a rendering of a scene (e.g., for a video game cut scene or animated video), within a virtual experience (e.g., to enhance user enjoyment and engagement, and improving the immersive experience provided by 3D environments), and others.

Hereinafter, various functions and components associated with the facial animation engine 107 are described in detail with reference to FIG. 2, FIG. 3, and FIG. 4.

Figure 2:
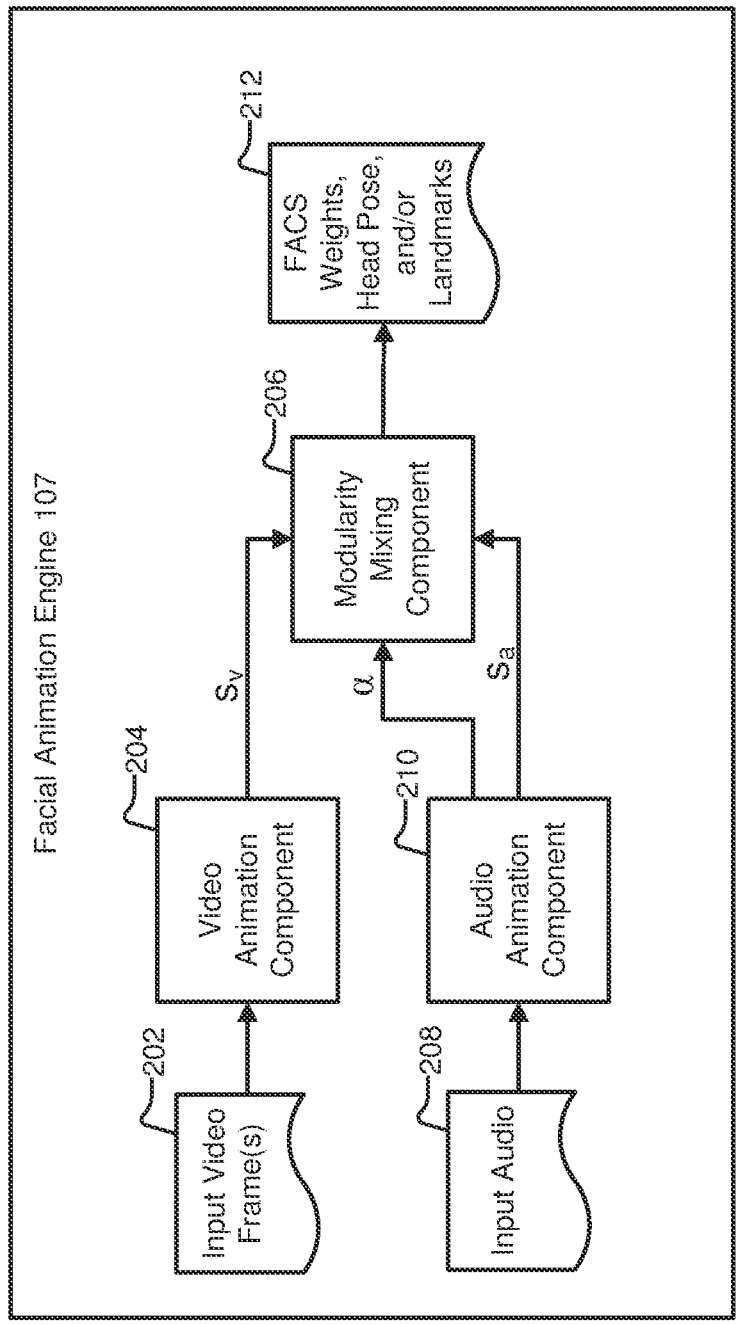
FIG. 2 is a diagram of a facial animation engine, in accordance with some implementations.

FIG. 2: Facial Animation Engine

FIG. 2 is a diagram of the facial animation engine 107, in accordance with some implementations. As illustrated, the facial animation engine 107 includes a video animation component 204. The video animation component 204 may be a software component deployed at a computing device that includes one or more models trained to provide robust facial animation output as FACS weights $s_v$, determined from input video frames 202.

Input video frames 202 may be received from a camera, image capture device, or another device/technique (e.g., such as stored video, recreated video, synthesized video, and others). The input video frames may be transmitted to the video animation component 204. Thereafter, the video animation component 204 may determine and output the FACS weights $s_v$. For example, the video animation component 204 may output FACS weights based upon video, and therefore may include facial movements such as movements of: eyebrows, eyes, eyelids, nose, ears, cheeks, chin, neck, lips, mouth, and others.

The facial animation engine 107 further includes an audio animation component 210. The audio animation component 210 may be a software component deployed at a computing device that includes one or more models trained to provide robust facial animation output as FACS weights $s_a$, determined from input audio 208.

Input audio 208 may be received from a microphone, audio capture device, or another device/technique (e.g., such as stored audio, recreated audio, synthesized audio, and others). The input audio 208 may be transmitted to the audio animation component 210. Thereafter, the audio animation component 210 may determine and output the FACS weights $s_a$. and the audio signal $\alpha$. For example, the audio animation component 210 may output FACS weights based upon audio and/or phonemes, and therefore may include facial movements such as movements of: lips, mouth, tongue, jaw, and others. The FACS weights $s_a$ may also include values representative of jaw drop, lip pucker, lip stretch, and others that are discernible from audio information. Furthermore, the audio animation component 210 may determine if a speaker is uttering, and adjust and/or output a representative of detected speech and/or utterances.

The facial animation engine 107 may further include a modularity mixing component 206. The modularity mixing component 206 may be a software component deployed at a computing device and configured to mix or fuse $s_v$ and $s_a$ FACS weights based upon a weighted linear function and/or voice activity signal $\alpha$. For example, the modularity mixing component 206 may mix or fuse $s_v$ and $s_a$ FACS weights based upon Equation 1, in some implementations, provided below:

$$FACS_i = FACS_{v,i}(1 - \alpha) + \alpha (w_{a,i}FACS_{a,i} + w_{v,i}FACS_{v,i}) \quad \text{Equation 1}$$

In Equation 1, the mixed or fused results are represented by $FACS_i$, and are derived from video animation component output $FACS_{v,i}$ and audio animation component output $FACS_{a,i}$. It is noted that i is representative of an index value for individual frames or groupings of frames of input video. Furthermore, $\alpha$ represents a voice activity signal, and $w_{a,i}$ and $w_{v,i}$ are mixing weights for audio results and video results, respectively. It is noted that if there is no speaking detected in the input audio 208, the audio animation component 210 outputs $\alpha$ as zero, and predictions from the video animation component 204 drive the final FACS weights 212. If voice activity is detected, the value of $\alpha$ transitions from zero to one and the final FACS weights 212 become a weighted combination of results from both the video animation component 204 and the audio animation component 210.

Hereinafter, operation and components associated with the video animation component 204 are described in detail with reference to FIG. 3.

Figure 3:
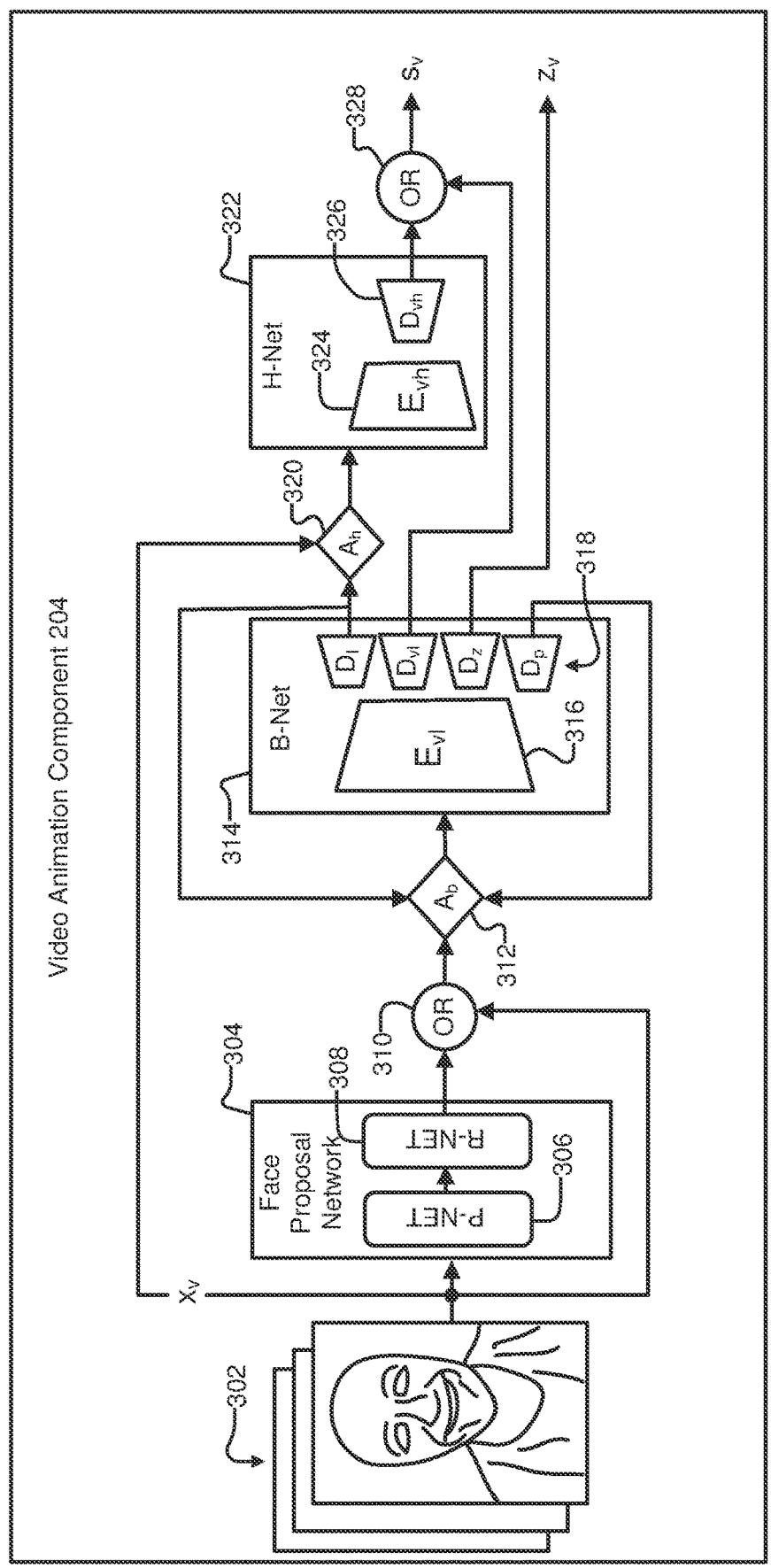
FIG. 3 is a diagram of a video animation component, in accordance with some implementations.

FIG. 3: Video Animation Component

FIG. 3 is a diagram of the video animation component 204, in accordance with some implementations. As shown, the video animation component 204 is configured to receive input video frames 302. The input video frames may be provided to an initial face proposal network 304. In some implementations, the input video frames may also be directed such that the face proposal network 304 is bypassed upon detection of a face (e.g., element 310 and 320).

The face proposal network 304 may include both a proposal network 306 (labeled P-Net) and a refinement network 308 (labeled R-Net). The P-Net 306 may be configured to determine face proposals. For example, the P-Net 306 may be configured to determine if a person's face is located within a video frame of the input video frames 302.

The R-Net 308 may be configured to filter the determined face proposals received from the P-Net 306. The R-Net 308 may further be configured to refine the determined face proposals within appropriate bounding boxes. Upon detecting a user's face, and refining the detected face within a bounding box, the face proposal network 304 may be bypassed at logical OR function 310. The bypass of the face proposal network 304 may improve a speed at which video FACS weights $s_v$ are output by reducing overall computational cycles.

One or both of P-Net 306 and R-Net 308 may be portions of a Multi-task Cascaded Convolutional Network (MTCNN) of the video animation component 204. In that regard, P-Net 306 and R-Net 308 may be an initial stage of a MTCNN.

Upon refinement into bounding boxes and/or bypass of the face proposal network 304, two level-of-detail decision blocks 312 and 320 may be operated in an interlocked manner. For example, for a first level of detail, decision block 312 may direct the refined input video frames and bounding boxes to B-Net 314, which represents a basic level-of-detail. For example, for a second level of detail, decision block 320 may direct the refined input video frames and bounding boxes to H-Net 314, which represents a higher level of detail than the first level of detail. Furthermore, in some implementations, both B-Net 314 and H-Net 322 may be used, providing a highest level of detail, which is higher than both the first and second levels of detail.

B-Net 314 (also referred to as Basic-Net) includes a feature encoder 316 and up to four decoders 318. The four decoders 318 include a landmark decoder $D_l$, a FACS decoder $D_{vl}$, a headpose decoder $D_z$, and a face probability decoder $D_p$. In some implementations, the feature encoder 316 is a convolutional neural network. In some implementations, the landmark decoder $D_l$, FACS decoder $D_{vl}$, headpose decoder $D_z$, and face probability decoder $D_p$ are relatively small, temporally aware neural networks configured to input high level features output by the feature encoder 316.

It is noted that unlike convolutions that are applied over spatial dimension, causal convolution layers of the decoders 318 are applied over the time dimension. In this regard, the decoders 318 (and 326, described below) allow for implicit learning of filtering functions that reduce jitter while maintaining responsiveness in FACS weights outputs. Furthermore, the relatively small size of the decoders results in a reduction in size of the feature encoder 316 without compromising output quality because the availability of temporal information allows the decoders 318 to compensate for lower quality features output by the feature encoder 316.

It is noted that the landmark decoder $D_l$, FACS decoder $D_{vl}$, headpose decoder $D_z$, and face probability decoder $D_p$ are trained on continuous sequences of video data as opposed to singular images, and therefore are able to be trained to associate temporal relationships between the input video frames 302. The landmark decoder $D_l$ may be configured to decode facial landmarks for use as input to the H-Net 322. The FACS decoder $D_{vl}$ may be configured to generate FACS weights as output should the H-Net 322 be bypassed (e.g., at logical OR operation 328 and switching/decision block 320. The headpose decoder $D_z$ may be configured to output a headpose signal zv to aide in realistic head poses in animation of an avatar. Additionally, the face probability decoder $D_p$ may be configured to operate decision block 312 for bypass of the face proposal network 304.

Other forms of bypass blocks may be implemented in lieu of the particular bypass components shown, to aid in bypassing the face proposal network 304 and/or B-Net 314 and/or H-Net 322.

H-Net 322 (also referred to as HiFi-Net) includes a feature encoder 324 and decoder 326. The decoder 326 is a FACS decoder $D_{vh}$. In some implementations, the feature encoder 324 is a convolutional neural network. In some implementations, the FACS decoder $D_{vh}$ is a relatively small, temporally aware neural network configured to input high level features output by the feature encoder 324.

B-Net 314 and H-Net 322 and respective encoders 316, 324, differ in input resolution and overall size of associated convolutional neural networks. For example, B-Net 314 and associated encoder 316 consist of a smaller input resolution as compared to H-Net 322 and associated encoder 324. Accordingly, in operation, a higher resolution output may be obtained from H-Net 322 as compared to B-Net 314. Thus, different client devices of differing computational capabilities may be used to implement facial tracking features as described herein, with appropriate bypassing allowing lower-end devices to provide automatic and robust animation using B-Net 314, and higher-end devices being capable of implementing either B-Net 314 or H-Net 322.

Additionally, B-Net 314 and H-Net 322 and respective encoders 316, 324 may be operative to execute upon every frame (e.g., 30 frames-per-second [fps]) or subsample inputs and execute at a lower frame rate (e.g., 15 fps). Producing outputs at 15 fps may under some circumstances degrade visual quality. However, in some implementations, for 'skipped' input frames when executing an encoder at 15 fps, the system may take as input the associated encoder's feature vector from the previous frame, which allows extrapolation of the FACS outputs and generate results that are substantially similar or almost identical to outputs of running the encoders at 30 fps. It is noted that this interpolation may be effectuated through the above-described causal convolution architecture which provides a form of time filtering.

As illustrated, the video animation component 204 is configured to output video animation FACS weights $s_v$. The video animation FACS weights $s_v$ may be used for robust facial animation with or without audio animation FACS weights, as described above with reference to modularity mixing component 206 and Equation 1. In implementations where audio is available and/or selected by a user, the audio animation component 210 may be operable to provide as output audio animation FACS weights $s_a$.

Figure 4:
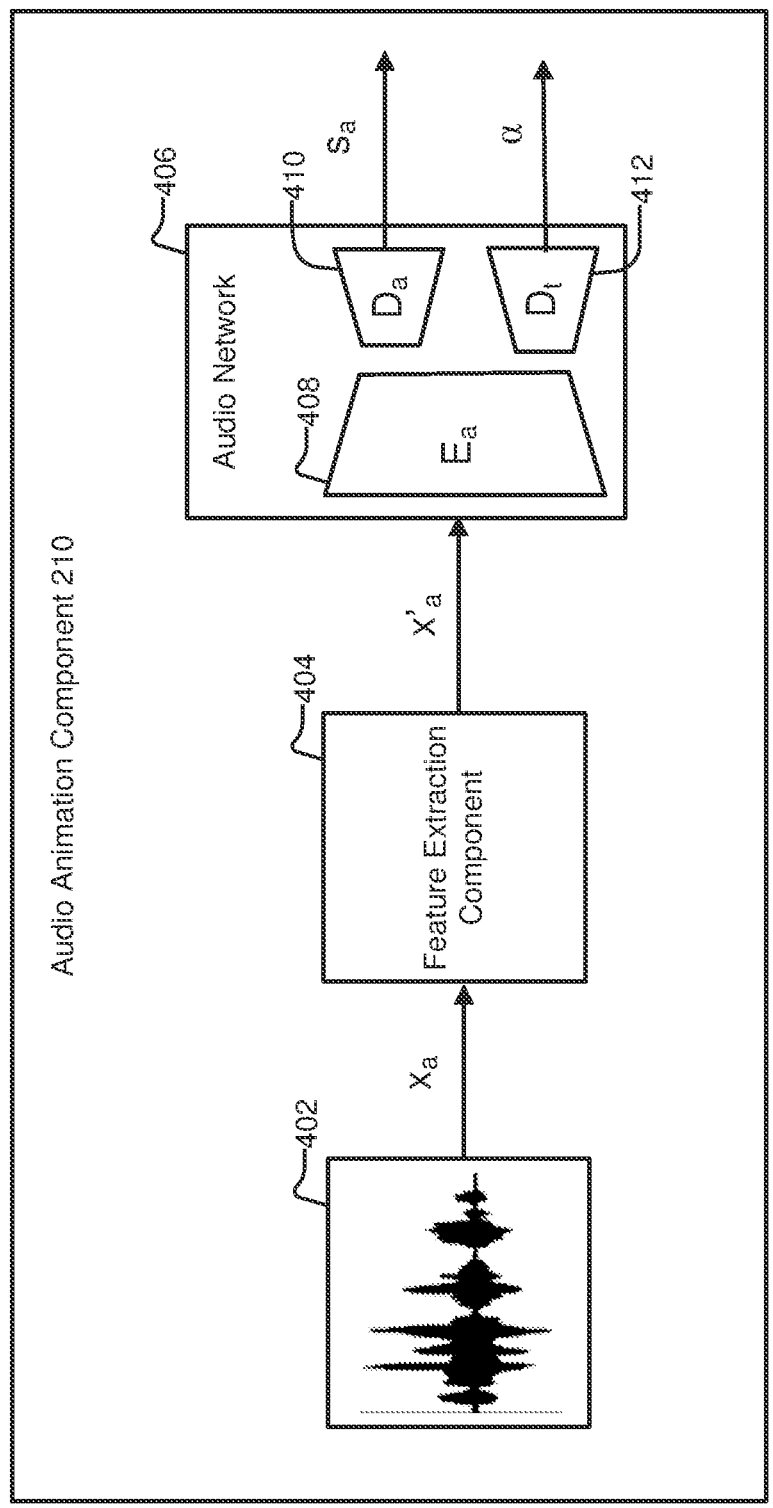
FIG. 4 is a diagram of an audio animation component, in accordance with some implementations.

FIG. 4: Audio Animation Component

FIG. 4 is a diagram of audio animation component 210, in accordance with some implementations. As shown, the audio animation component 210 may be configured to receive input audio 402. The input audio 402 may be captured through a microphone or be synthesized for non-verbal users, in some implementations.

The input audio 402 may be processed by feature extraction component 404 to extract features at a first hop length and a first window length. In some implementations, the feature extraction component is configured to extract twenty-six features at a hop length of 16 ms and a window length of 16 ms. Other variations are applicable depending upon any particular implementation.

In some implementations, five consecutive frames of extracted features are packed together to form an input package for audio network 406. In some implementations, audio network 406 is arranged to include a feature encoder 408, and up to two decoders 410, 412. The feature encoder 408 may include a stack of causal convolutional layers followed by a batch norm. The causal convolutional layers may expand a receptive field without introducing latency as it is arranged to inspect series values from the past (e.g., in a temporal sense). An additional layer may be arranged to operate along the time dimension to retain a temporal embedding. The additional layer may be a recurrent neural network, such as a long short-term memory layer (LSTM layer).

Decoder 410 may be configured to decode audio FACS weights $s_a$ while decoder 412 may be configured to provide the audio signal α described above. As such, the decoder 410 and 412 are operative as dedicated to a particular task, resulting in improved efficiency and a reduction in computational cost compared to a larger decoder for multiple tasks.

Both the video animation component 204 and audio animation component 210 are trained in a multi-phase/multi-stage training process whereby associated encoders are initially trained, and decoders are subsequently trained while weights of the encoders are frozen/fixed based on prior training data. Hereinafter, training of the video animation component 204 is described with reference to FIG. 5 and training of the audio animation component 210 is described with reference to FIG. 6.

FIG. 5: Training a Video Animation Component

Figure 5A:
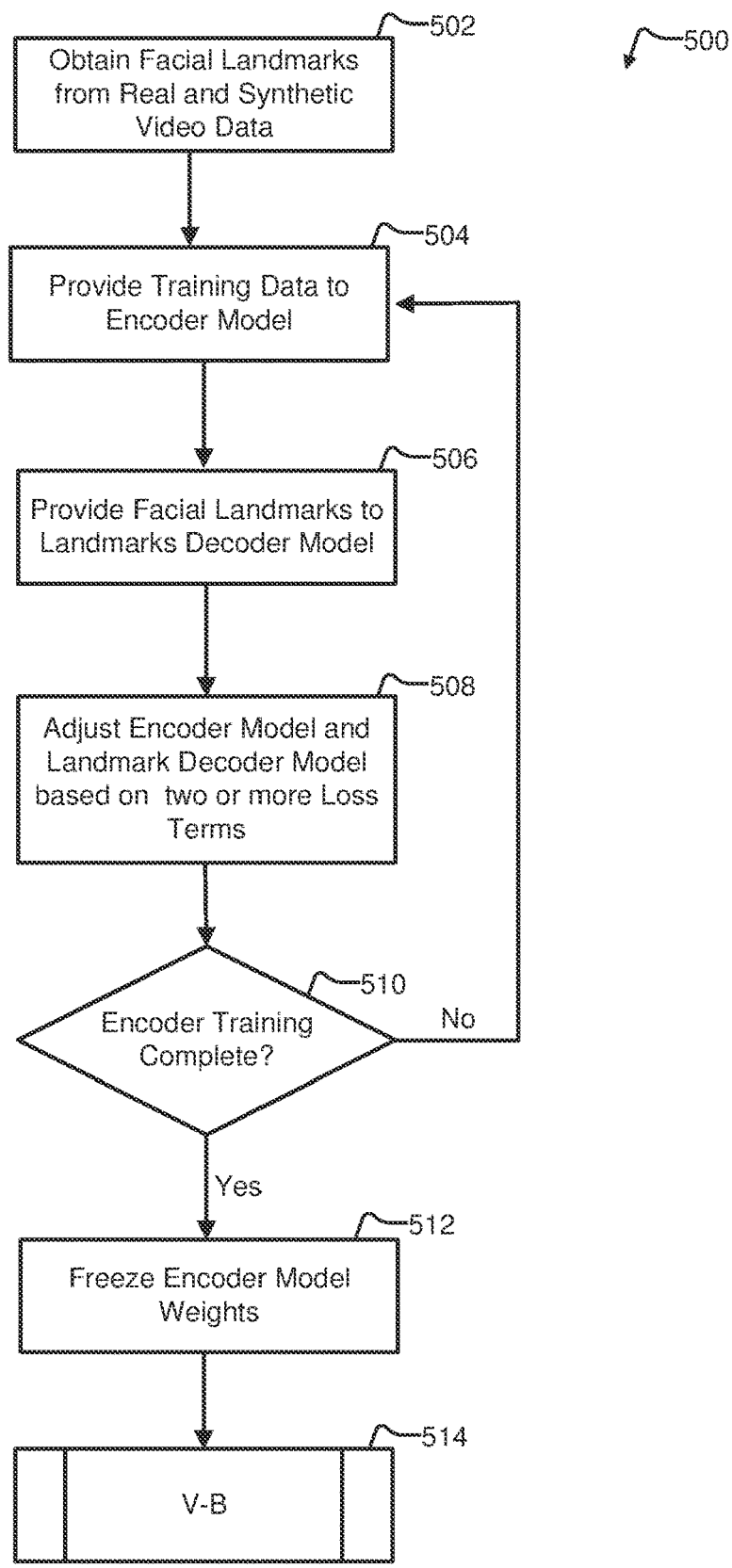
FIGS. 5A and 5B illustrate a flowchart of an example method of training portions of a video animation component, in accordance with some implementations.
Figure 5B:
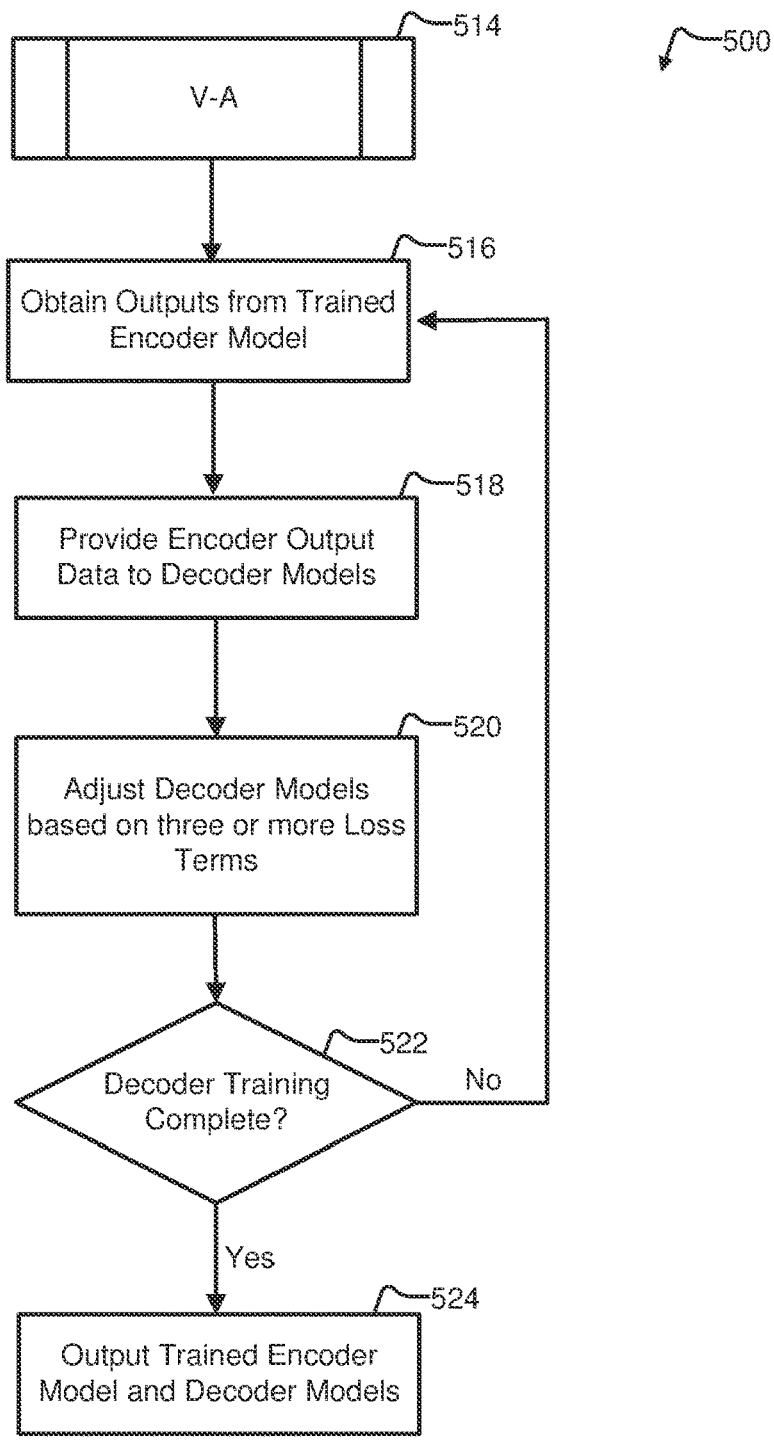

FIGS. 5A and 5B illustrate a flowchart 500 of an example method of training portions of the video animation component 204, in accordance with some implementations. In some implementations, method 500 can be implemented, for example, on a server system, e.g., online virtual experience platform 102 as shown in FIG. 1. In some implementations, some or all of the method 500 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 500. The method 500 commences at block 502.

At block 502, facial landmarks are obtained from both real and synthetic video training data. For example, training a FACS model in a supervised way directly from synthetic data is not straightforward, because the domain gap between synthetic data and actual real faces is large. Accordingly, the feature representations learned by a network trained on a synthetic dataset are different from ones required for real data. Therefore, a model trained on only synthetic datasets is not able to generalize. Thus, both real and synthetic datasets are used for training, with facial landmarks being obtained for a first phase of encoder training. Although facial landmarks are not used in the regression steps described above with reference to FIG. 3, the landmarks aid in the model being trained to learn a representation that is valid for both real and synthetic data. Block 502 is followed by block 504.

At block 504, the training data is provided to the encoder model for training. For example, the real and synthetic video frames are provided as input to an associated encoder of the video animation component 204. Block 504 is followed by block 506.

At block 506, the obtained facial landmarks are provided to the landmark decoder $D_l$. In this manner, the landmark decoder $D_l$ may be trained concurrently with the encoder. Block 506 is followed by block 508.

At block 508, the encoder and/or landmark decoder are adjusted based on two or more loss terms. For example, two or more terms may be linearly combined such that the encoder and/or landmark decoder can be jointly trained.

A first loss term may be $L_{LMK}$, which is a positional loss on landmarks. The root mean square error of the regressed positions may be used for positional loss. A second loss term may be $L_{CON}$, which is a consistency loss on landmarks. The consistency loss on landmarks may encourage landmark predictions to be equivariant under different transformations, and may allow use of pairs of real images without landmark annotations. Based on respective outputs and calculated loss terms, internal weights for each of the encoder and landmark decoder may be adjusted. Block 508 is followed by block 510.

At block 510, it is determined if all training data has been input, or if training is otherwise complete. For example, a threshold number of training epochs being accomplished or a threshold amount of images being input may indicate a training process is complete. Other thresholds or conditions upon training may also be applicable. If training is complete, block 510 may be followed by block 512. Else, block 510 is followed by block 504, where additional training data is input to the encoder.

At block 512, if training is completed, internal weights for the encoder are frozen and a second phase of training may commence at block 514. Block 514 is followed by block 516.

At block 516, outputs from the trained encoder are obtained. For example, an additional training set or other training data may be provided as input to the trained encoder. The encoder outputs may be obtained for training of individual decoders. Block 516 is followed by block 518.

At block 518, the encoder output is provided to the untrained decoders (e.g., FACS decoder $D_{vl}$, headpose decoder $D_z$, and face probability decoder $D_p$). For example, the high level encoded features output by the trained encoder are input into each decoder. Block 518 is followed by block 520.

At block 520, the decoders are adjusted based on three or more loss terms. For example, the three or more loss terms may be linearly combined. A first loss term may be $L_{POS}$, which is a positional loss on FACS weights. The mean square error may be used as the $L_{POS}$ loss term. A second loss term may be $L_{VEL}$, which is a velocity loss. The use of $L_{VEL}$ can help reduce jitter by encouraging smoothness of dynamic expressions. A third loss term may be $L_{ACC}$, which is acceleration regularization loss. The regularization term on the acceleration is added to reduce FACS weights jitter (e.g., its weight is kept low to preserve responsiveness). Block 520 is followed by block 522.

At block 522, it is determined if all training data has been input, or if training is otherwise complete. For example, a threshold number of training epochs being accomplished or a threshold amount of encoded features being input may indicate a training process is complete. Other thresholds or conditions upon training may also be applicable. If training is complete, block 522 may be followed by block 524. Else, block 522 is followed by block 516, where additional training data (e.g., encoded features from trained encoder) is input to the decoders.

At block 524, if training is completed, internal weights for the decoders are frozen and the trained encoder and decoders are output and/or may be deployed.

As described above, a two-phase training approach is used to train the video animation component 204 and associated sub-components. A two-stage approach is also used to train the audio animation component 210, as described below.

FIG. 6: Training an Audio Animation Component

Figure 6A:
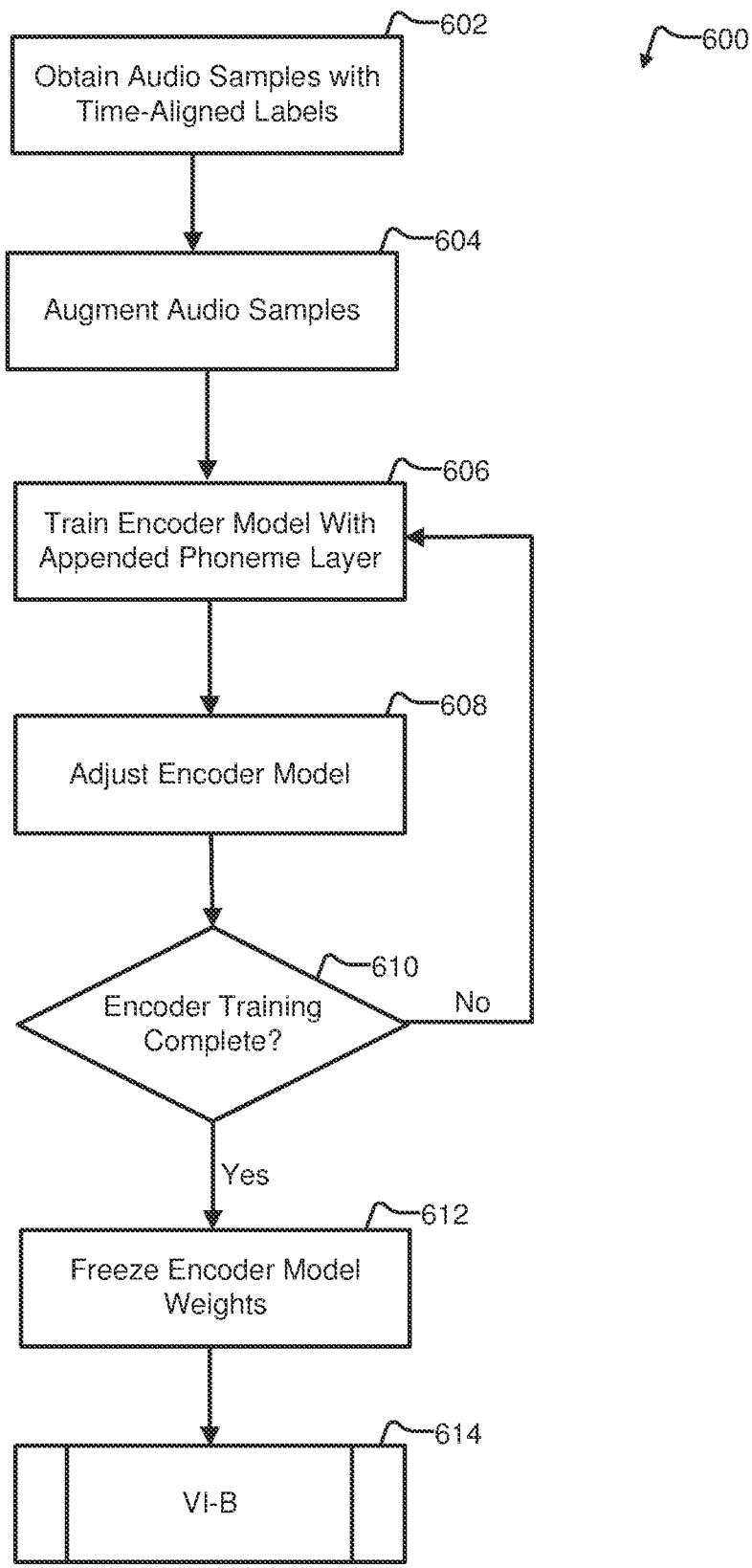
FIGS. 6A and 6B illustrate a flowchart of an example method of training portions of an audio animation component, in accordance with some implementations.
Figure 6B:
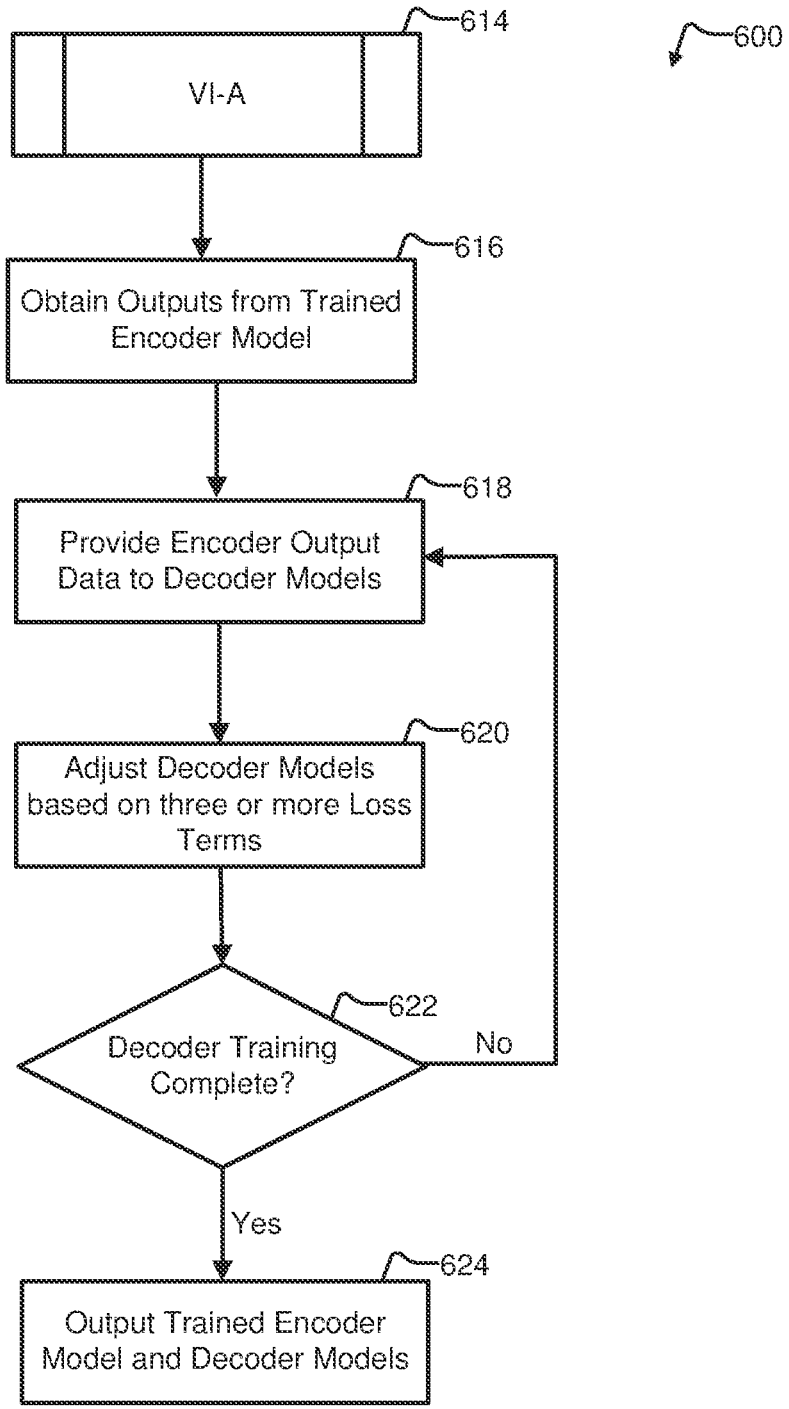
Figure 6C:
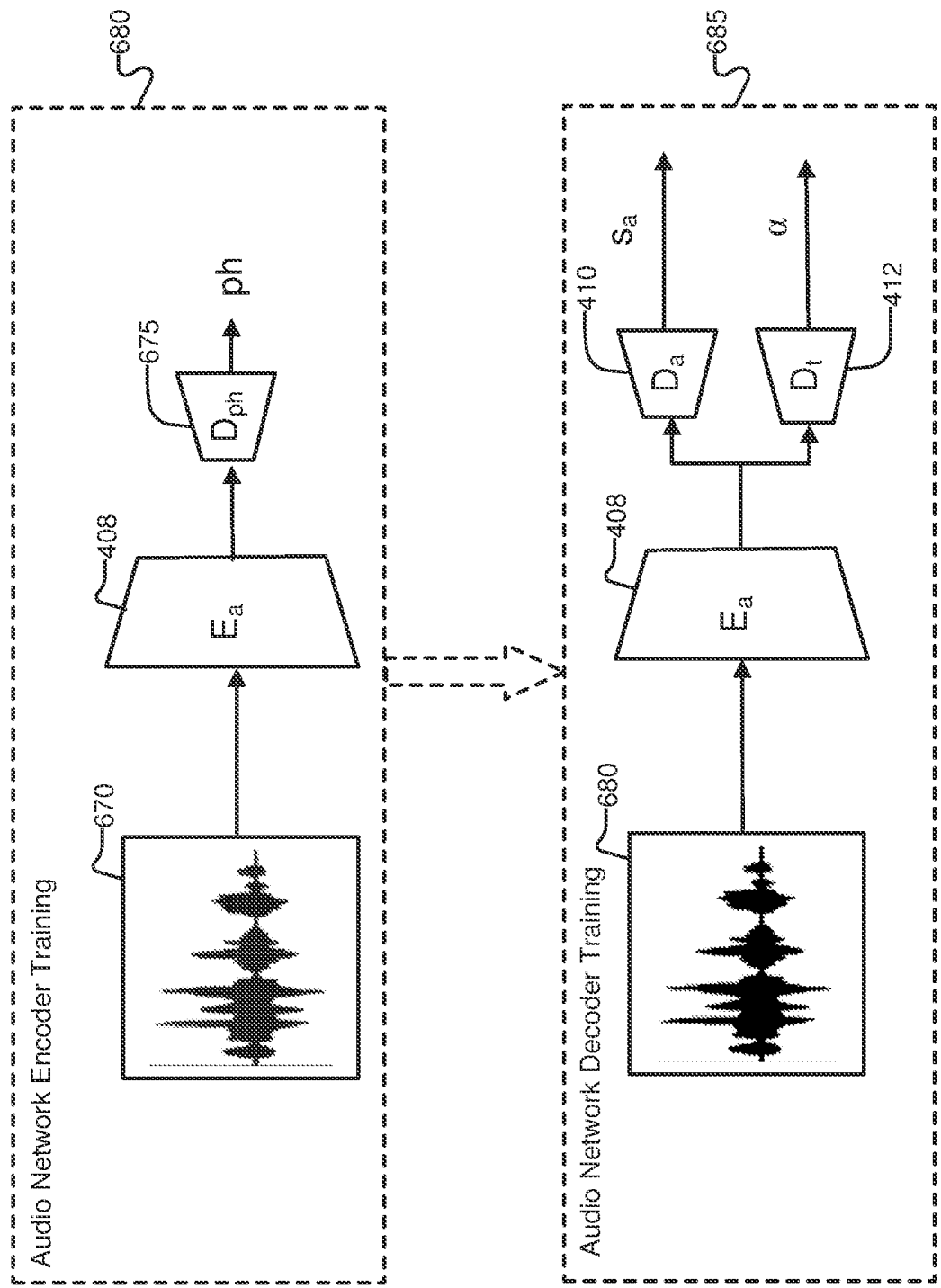
FIG. 6C illustrates example training environments for training portions of an audio animation component, in accordance with some implementations.

FIGS. 6A and 6B illustrate a flowchart 600 of an example method of training portions of an audio animation component, in accordance with some implementations. In some implementations, method 600 can be implemented, for example, on a server system, e.g., online virtual experience platform 102 as shown in FIG. 1. In some implementations, some or all of the method 600 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 600. The method 600 commences at block 602.

At block 602, audio samples with time-aligned labels are obtained. Block 602 is followed by block 604.

At block 604, the training data is augmented. For example, audio samples are augmented with a variety of randomly selected noise and pitch transformations. In order to improve the robustness of the model to different types of noise, the input audio samples are augmented by adding randomly generated white noise or selecting pre-recorded ambient noise, such as street, restaurant, wind, or rain sounds.

To simulate people speaking in different virtual rooms, impulse response convolution may be to add reverberation to the input audio. Additionally, pitch shifting, gain shifting, and speed changing may also be used for further augmenting the audio samples. Block 604 is followed by block 606.

At block 606, the augmented audio samples are provided to the encoder as well as to an appended phoneme layer or phoneme decoder. For example, and with reference to FIG. 6C, augmented audio samples 670 may be provided to the encoder 408 and the appended phoneme decoder 675, at an initial training phase labeled as 680.

While the phoneme decoder 675 is not a permanent component or otherwise will not be used in operation, phoneme prediction tasks may result in sharper or more consistent outputs. The intuition is that phonetic speech has a strong correlation to visual speech units (e.g., jaw, lip, mouth movements). Thus, training a phoneme recognition task favors an internal representation that is transformable to continuous analogues of viseme sequences, represented as FACS curves. In some implementations, the phoneme decoder 675 is implemented as a fully connected layer after the embedding to estimate phoneme labels. Turning back to FIG. 6A, block 606 is followed by block 608.

At block 608, the encoder is adjusted based on a loss terms. For example, a sole connectionist temporal classification (CTC) loss may be calculated and used to adjust the encoder. Block 608 is followed by block 610.

At block 610, it is determined if all training data has been input, or if training is otherwise complete. For example, a threshold number of training epochs being accomplished or a threshold amount of images being input may indicate a training process is complete. Other thresholds or conditions upon training may also be applicable. If training is complete, block 610 may be followed by block 612. Else, block 610 is followed by block 604, where additional training data is input to the encoder.

At block 612, if training is completed, internal weights for the encoder are frozen and a second phase of training may commence at block 614. Block 614 is followed by block 616.

At block 616, outputs from the trained encoder are obtained. For example, an additional training set or other training data may be provided as input to the trained encoder. The encoder outputs may be obtained for training of the decoders. Block 616 is followed by block 618.

At block 618, the encoder output (e.g., a phoneme-aware representation of the input data) is provided to the untrained decoders. For example, and with reference to FIG. 6C, the second phase of training 685 may include training both the decoder 410 and decoder 412 using the phoneme-aware encoded features provided by the trained encoder 408, which are based on input audio samples 680. It is noted that training data 670 comprises audio samples from multiple speakers, while training data 680 is based on a single speaker. In this manner, the encoder will not be biased towards a single speaker's voice. Turning back to FIG. 6B, Block 618 is followed by block 620.

At block 620, the decoders are adjusted based on three or more loss terms. For example, the three or more loss terms may be linearly combined. A first loss term may be $L_{POS}$, which is a positional loss on FACS weights. The mean square error may be used as the $L_{POS}$ loss term. A second loss term may be $L_{VEL}$, which is a velocity loss. The use of $L_{VEL}$ can help reduce jitter by encouraging smoothness of dynamic expressions. A third loss term may be $L_{VAD}$, which is a cross entropy loss. It is noted that both $L_{POS}$ and $L_{VEL}$ in the audio network training may be implemented as a smoothed L1 loss whereas the same loss terms are L2 loss in the video network training. Block 620 is followed by block 622.

At block 622, it is determined if all training data has been input, or if training is otherwise complete. For example, a threshold number of training epochs being accomplished or a threshold amount of encoded features being input may indicate a training process is complete. Other thresholds or conditions upon training may also be applicable. If training is complete, block 622 may be followed by block 624. Else, block 622 is followed by block 616, where additional training data (e.g., encoded features from trained encoder) is input to the decoders.

At block 624, if training is completed, internal weights for the decoders are frozen and the trained encoder and decoders are output and/or may be deployed.

As described above, both video animation components and audio animation components may be trained using a two-phase approach which results in a more robust FACS weight output for animation. Hereinafter, functions and operations associated with the deployed, trained models are described with reference to FIG. 7.

Figure 7:
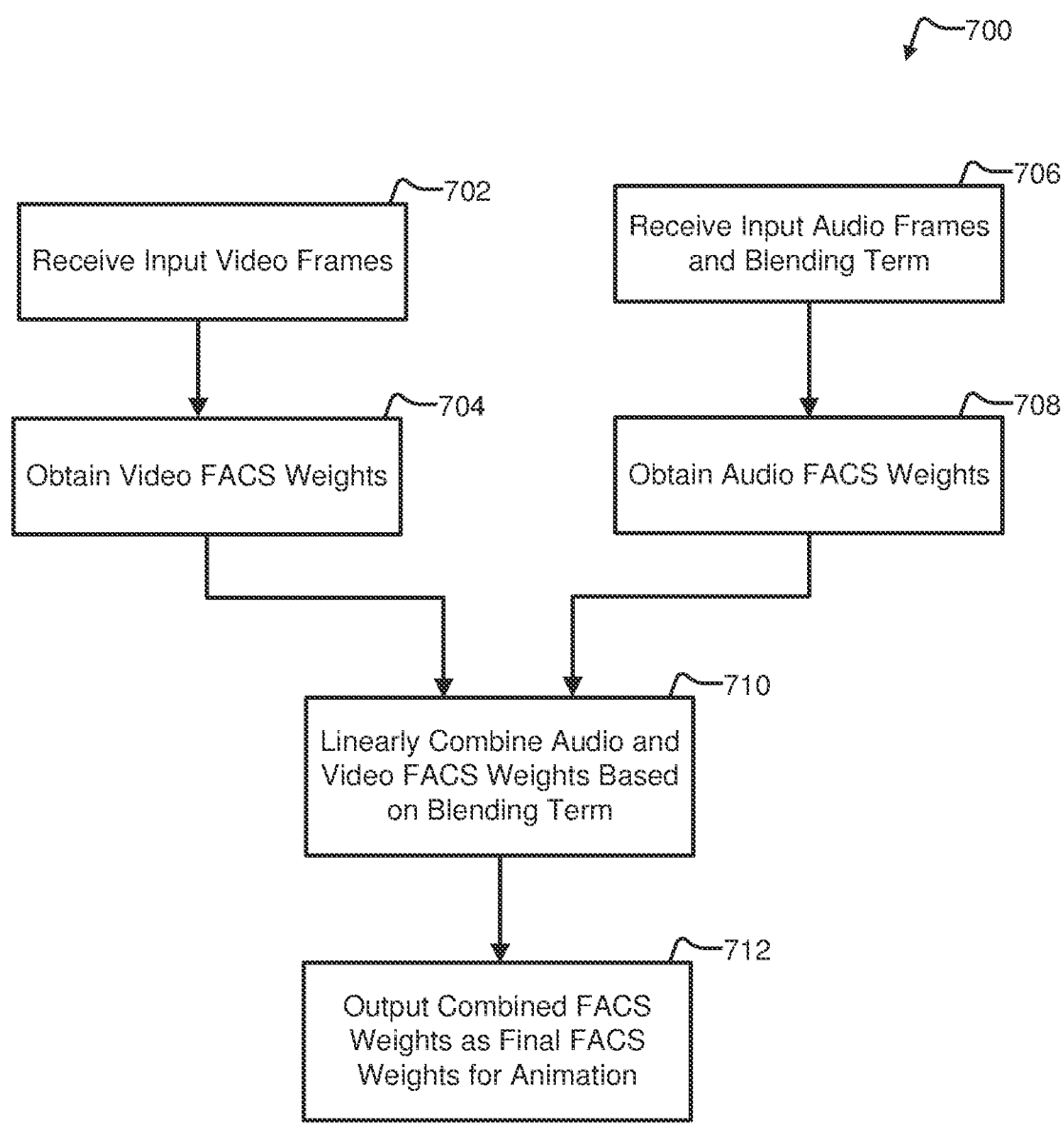
FIG. 7 is a flowchart of an example method of real-time robust facial animation from video and audio, in accordance with some implementations.

FIG. 7: Animating an Avatar with Trained Models

FIG. 7 is a flowchart of an example method 700 of real-time robust facial animation from video and audio, in accordance with some implementations. In some implementations, method 700 can be implemented, for example, on a server system, e.g., online virtual experience platform 102 as shown in FIG. 1. In some implementations, some or all of the method 700 can be implemented on a system such as one or more client devices 110 and 116 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 700.

To provide avatar animation, a face from an input video may be detected and facial landmarks, head pose, tongue status, etc. may be determined and utilized to animate the face of a corresponding avatar. Additionally, audio may be received from a microphone and facial movements may be determined from phonemes. Prior to performing face detection or analysis, the user is provided an indication that such techniques are utilized for avatar animation. If the user denies permission, facial animation based on video and/or audio is turned off (e.g., default animation may be used, or animation may be based on other user-permitted inputs such as audio and/or text input provided by the user). The user provided video and/or audio is utilized specifically for avatar animation and is not stored. The user can turn off video analysis, audio analysis, and animation generation at any time. Further, facial detection is performed to detect a position of the face within the video; no facial recognition is performed. If the user permits use of video analysis and audio analysis for avatar animation, method 700 begins at block 702 and block 706.

At block 702, input video frames are received from a user device. For example, a user's face may be captured on a camera or image capture device. In some implementations, a user may select an option in an interface to allow the capture of images. In these and other examples, a user may also opt-out of automatic animation from video and/or audio. Block 702 is followed by block 704.

At block 704, video FACS weights are obtained from a trained machine learning model. For example, the video FACS weights may be obtained from the video animation component 204. The video FACS weights may be based on a first level of detail (e.g., leveraging only B-Net 314), a second level of detail (e.g., leveraging only H-Net 322), or a third level of detail (leveraging both B-Net 314 and H-Net 322).

At block 706, input audio frames and a blending term (e.g., active audio input signal α, active speech signal, non-muted audio signal, and/or others) are received from a user device. The blending term may be increased from a value of zero (no audio or speaking present) to a value of one. The blending term is described in detail above with reference to Equation 1. Block 706 is followed by block 708.

At block 708, audio FACS weights are obtained from a trained machine learning model. For example, the audio FACS weights may be obtained from the audio animation component 210. Blocks 704 and 708 may be followed by block 710.

At block 710, the audio FACS weights and video FACS weights are combined with a modularity mixing component. The combining may include linearly combining the audio FACS weights and the video FACS weights. Additionally, the combining may be based upon the blending term. For example, if a user does not actively utter speech, the blending term may be close to (or at) zero such that no audio FACS weights are combined. Additionally, for example, if the user is actively uttering speech, the blending term may be used to combine the audio FACS weights with the video FACS weights as described in detail above with reference to Equation 1. Block 710 is followed by block 712.

At block 712, the combined FACS weights are output as final FACS weights for animation of a user's avatar, a character rig, a 3D model, or any other animation-capable construct. For example, the final FACS weights may be a linearly combined blend or fusion of both the video and audio FACS weights. In this manner, even if a user's face is partially occluded while the user is actively speaking, an avatar may be animated. For example, the audio may be used to generate FACS weights that provide movement of lips, jaw, and/or mouth based solely on audio. Furthermore, even if a user is not actively speaking, the video FACS weights may be used to animate an avatar's eyes, mouth, head, and others based on actual motion despite a lack of utterance of speech. These and other features provide a robust facial animation framework that overcome many drawbacks, and provide technical effects and benefits including: reduced computational cost, improved energy efficiency, improved storage use, improved bandwidth use, and others.

Blocks 702-712 can be performed (or repeated) in a different order than described above and/or one or more blocks can be omitted, modified, combined with other blocks, supplemented with blocks, etc. Method 700 can be performed on a server (e.g., 102) and/or a client device (e.g., 110 or 116). Furthermore, portions of the method 700 may be combined and performed in sequence or in parallel, according to any desired implementation.

As described above, the techniques of robust facial animation include implementation of trained face detection models, audio models, and trained regression models at a client device. The models may output video and audio FACS weights that are linearly combined at a modularity mixing component based on a blending term to create final FACS weights for facial animation of a user's avatar, a character rig, a 3D model, or another animation-capable construct.

Hereinafter, a more detailed description of various computing devices that may be used to implement different devices and components illustrated in FIGS. 1-4 is provided with reference to FIG. 8.

Figure 8:
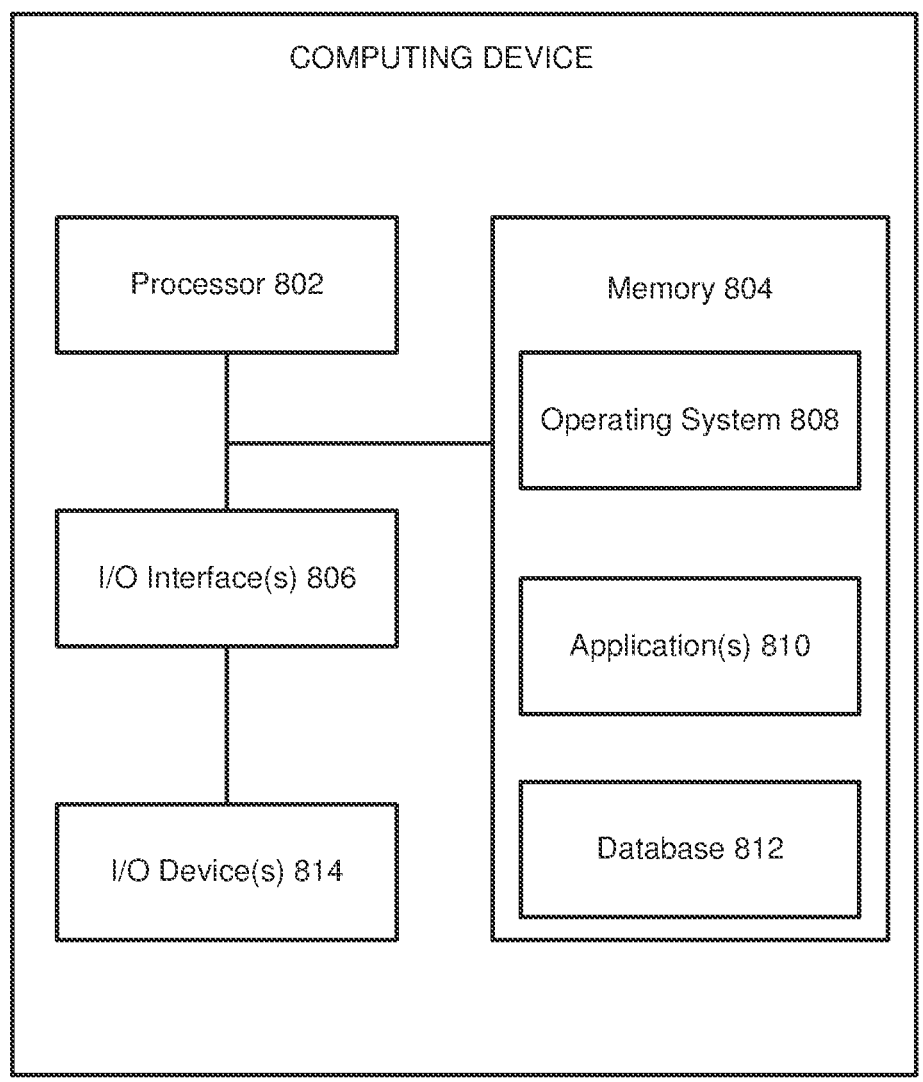
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 102, 110, and/or 116 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 802 and/or integrated therewith. Memory 804 can store software operating on the server device 800 by the processor 802, including an operating system 808, an application 810 and associated data 812. In some implementations, the application 810 can include instructions that enable processor 802 to perform the functions described herein, e.g., some or all of the methods of FIGS. 5-7. In some implementations, the application 810 may also include one or more trained models for generating robust real-time animation based on input video, as described herein.

For example, memory 804 can include software instructions for an application 810 that can provide animated avatars based on a user's facial movements caught on camera (or another device) and audio captured via a microphone (or another device), within an online virtual experience platform (e.g., 102). Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 108), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808 and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online virtual experience platform 102 is described as performing operations as described in some implementations herein, any suitable component or combination of components of online virtual experience platform 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods, etc.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 500, 600, 680, 685, and/or 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processors, application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which certain implementations discussed herein may obtain or use user data (e.g., images of users, video of users, audio of users, user demographics, user behavioral data on the platform, user search history, items purchased and/or viewed, user's friendships on the platform, etc.) users are provided with options to control whether and how such information is collected, stored, or used. That is, the implementations discussed herein collect, store and/or use user information upon receiving explicit user authorization and in compliance with applicable regulations.

Users are provided with control over whether programs or features collect user information about that particular user or other users relevant to the program or feature. Each user for which information is to be collected is presented with options (e.g., via a user interface) to allow the user to exert control over the information collection relevant to that user, to provide permission or authorization as to whether the information is collected and as to which portions of the information are to be collected. In addition, certain data may be modified in one or more ways before storage or use, such that personally identifiable information is removed. As one example, a user's identity may be modified (e.g., by substitution using a pseudonym, numeric value, etc.) so that no personally identifiable information can be determined. In another example, a user's geographic location may be generalized to a larger region (e.g., city, zip code, state, country, etc.).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

Hereinafter, additional details and description of the FIGURES is provided in-context, and subsequently, claims directed to one or more aspects of this disclosure.

What is claimed is:

1. A computer-implemented method, comprising:
  receiving input video frames;
  receiving input audio frames and a blending term, wherein the input audio frames include audio associated with the input video frames;
  obtaining video facial action coding system (FACS) weights from a first trained machine learning model based on the input video frames, wherein the first trained machine learning model comprises at least one encoder and at least three task-specific decoders, and wherein:
    a first task-specific decoder of the at least three task-specific decoders is configured to output a predicted headpose,
    a second task-specific decoder of the at least three task-specific decoders is configured to output a probability that a face is visible in an input video frame of the received input video frames, and
    a third task-specific decoder of the at least three task-specific decoders is configured to output facial landmarks;
  obtaining audio FACS weights from a second trained machine learning model based on the input audio frames;

combining the video FACS weights and the audio FACS weights to obtain final FACS weights, wherein the combining is based at least in part on the blending term; and outputting the final FACS weights to drive facial animation of a three-dimensional (3D) model.

2. The computer-implemented method of claim 1, wherein the first trained machine learning model and the second trained machine learning model are trained in a two-stage semi-supervised training process.

3. The computer-implemented method of claim 1, wherein at least one of the at least three task-specific decoders comprises causal convolution layers applied over a time dimension.

4. The computer-implemented method of claim 1, wherein the second trained machine learning model comprises at least one encoder and at least two task-specific decoders.

5. The computer-implemented method of claim 4, wherein a first task-specific decoder of the at least two task-specific decoders of the second trained machine learning model is configured to output the audio FACS weights and a second task-specific decoder of the at least two task-specific decoders of the second trained machine learning model is configured to output the blending term.

6. A system, comprising:
a memory with instructions stored thereon; and
a processing device, coupled to the memory, wherein the processing device is configured to access the memory and execute the instructions, and wherein the instructions cause the processing device to perform operations comprising:
receiving input video frames;
receiving input audio frames and a blending term, wherein the input audio frames include audio associated with the input video frames;
obtaining video facial action coding system (FACS) weights from a first trained machine learning model based on the input video frames, wherein the first trained machine learning model comprises at least one encoder and at least three task-specific decoders, and wherein:
a first task-specific decoder of the at least three task-specific decoders is configured to output a predicted headpose,
a second task-specific decoder of the at least three task-specific decoders is configured to output a probability that a face is visible in an input video frame of the received input video frames, and
a third task-specific decoder of the at least three task-specific decoders is configured to output facial landmarks;
obtaining audio FACS weights from a second trained machine learning model based on the input audio frames;
combining the video FACS weights and the audio FACS weights to obtain final FACS weights, wherein the combining is based at least in part on the blending term; and
outputting the final FACS weights to drive facial animation of a three-dimensional (3D) model.

7. The system of claim 6, wherein the first trained machine learning model and the second trained machine learning model are trained in a two-stage semi-supervised training process.

8. The system of claim 6, wherein at least one of the at least three task-specific decoders comprises causal convolution layers applied over a time dimension.

9. The system of claim 6, wherein the second trained machine learning model comprises at least one encoder and at least two task-specific decoders.

10. The system of claim 9, wherein a first task-specific decoder of the at least two task-specific decoders of the second trained machine learning model is configured to output the audio FACS weights and a second task-specific decoder of the at least two task-specific decoders of the second trained machine learning model is configured to output the blending term.

11. A non-transitory computer-readable medium with instructions stored thereon that, responsive to execution by a processing device, causes the processing device to perform operations comprising:
receiving input video frames;
receiving input audio frames and a blending term, wherein the input audio frames include audio associated with the input video frames;
obtaining video facial action coding system (FACS) weights from a first trained machine learning model based on the input video frames, wherein the first trained machine learning model comprises at least one encoder and at least three task-specific decoders, and wherein:
a first task-specific decoder of the at least three task-specific decoders is configured to output a predicted headpose,
a second task-specific decoder of the at least three task-specific decoders is configured to output a probability that a face is visible in an input video frame of the received input video frames, and
a third task-specific decoder of the at least three task-specific decoders is configured to output facial landmarks;
obtaining audio FACS weights from a second trained machine learning model based on the input audio frames;
combining the video FACS weights and the audio FACS weights to obtain final FACS weights, wherein the combining is based at least in part on the blending term; and
outputting the final FACS weights to drive facial animation of a three-dimensional (3D) model.

12. The non-transitory computer-readable medium of claim 11, wherein the first trained machine learning model and the second trained machine learning model are trained in a two-stage semi-supervised training process.

13. The non-transitory computer-readable medium of claim 11, wherein at least one of the at least three task-specific decoders comprises causal convolution layers applied over a time dimension.

14. The non-transitory computer-readable medium of claim 11, wherein the second trained machine learning model comprises at least one encoder and at least two task-specific decoders, and wherein a first task-specific decoder of the at least two task-specific decoders of the second trained machine learning model is configured to output the audio FACS weights and a second task-specific decoder of the at least two task-specific decoders of the second trained machine learning model is configured to output the blending term.

* * * * *